United States Patent [19]

Smyly, Sr.

[11] Patent Number: 5,183,282
[45] Date of Patent: Feb. 2, 1993

[54] TRAILERED CRADLE AND BOAT/YACHT MANAGING METHOD

[76] Inventor: George M. Smyly, Sr., 1903 B Carlton St., North Charleston, S.C. 29405

[21] Appl. No.: 674,466

[22] Filed: Mar. 25, 1991

Related U.S. Application Data

[63] Continuation-in-part of Ser. No. 458,519, Dec. 28, 1989, Pat. No. 5,004,260.

[51] Int. Cl.$^5$ .............................................. B60P 3/10
[52] U.S. Cl. ................................. 280/414.1; 114/344; 414/482; 414/477
[58] Field of Search ..................... 280/414.1; 414/483, 414/482, 477, 478, 479, 498, 500, 532; 114/344

[56] References Cited

U.S. PATENT DOCUMENTS

| | | | |
|---|---|---|---|
| 3,138,271 | 6/1964 | DeLay et al. | 280/414.1 X |
| 3,140,003 | 7/1964 | Horner | 280/414.1 X |
| 3,380,607 | 4/1968 | Dale | 280/414.1 X |
| 3,390,796 | 7/1968 | Theobald | 280/414.1 X |
| 4,395,185 | 7/1983 | Whaley | 414/483 |
| 4,626,162 | 12/1986 | Parisi | 414/479 |
| 4,911,459 | 3/1990 | Smyly, Sr. | 280/414.1 |
| 5,004,260 | 4/1991 | Smyly, Sr. | 280/414.1 |
| 5,013,206 | 5/1991 | Ernst et al. | 280/414.1 X |

*Primary Examiner*—Margaret A. Focarino
*Assistant Examiner*—Kevin Hurley

[57] ABSTRACT

An improvement over my launcher/retriever cradle for trailered boats and my trailered boat cradle is accomplished by combining a cradle governor with the invention, the cradle governor replacing the old telescoping push/pull rod member of the invention. The cradle governor is a "break-back", fold up/out cradle launching/retrieving device. This new governor is essentially constructed of two hinged sections of rigid elongate material, a rearmost end of one of the sections being pivotally connected to the keel support platform member of the invention. An elongated extensible governor lift is pivotally connected to the forward end of the remaining governor section and the other end of the governor lift is pivotally connected at a forward location upon the trailer. Winching the cradle onto the trailer, the retriever cable associated with the winch being connected to the governor, causes the governor lift to fold the forward hinged section of the governor even beyond an up-right position. The forward end of the governor forward section is slidingly captured within track capture means associated with the trailer when the governor forward section and the governor in general are in a prone position. A longitudinally compact trailered boat cradle is accomplished by this improved invention and under normal conditions no portion of the trailer need come into contact with water during the launching and recovering of a vessel.

30 Claims, 15 Drawing Sheets

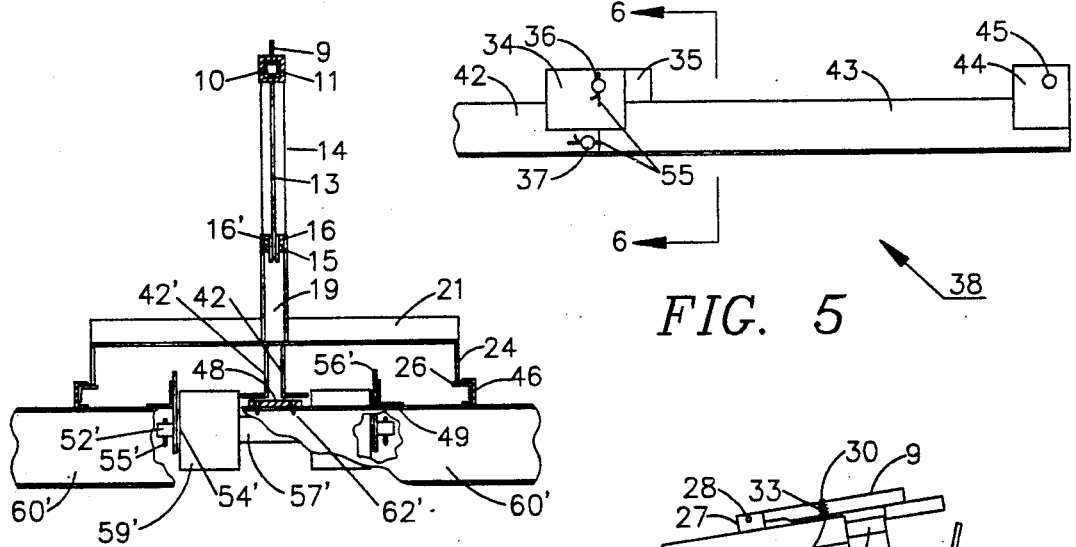
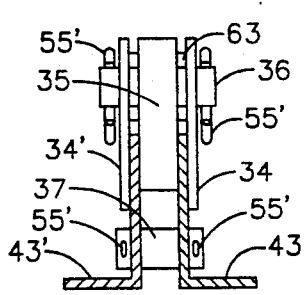
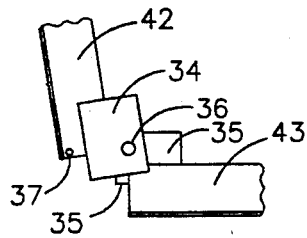
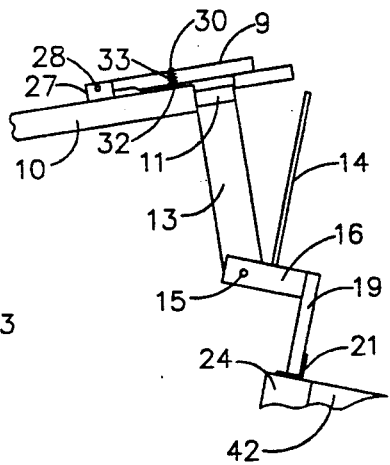
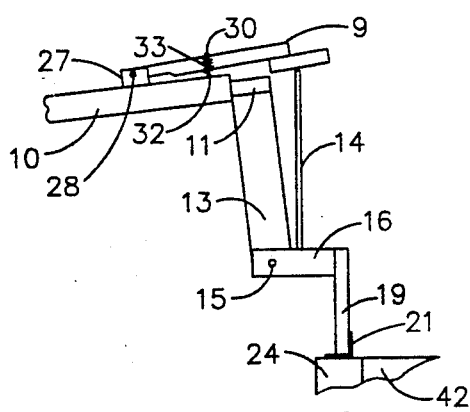
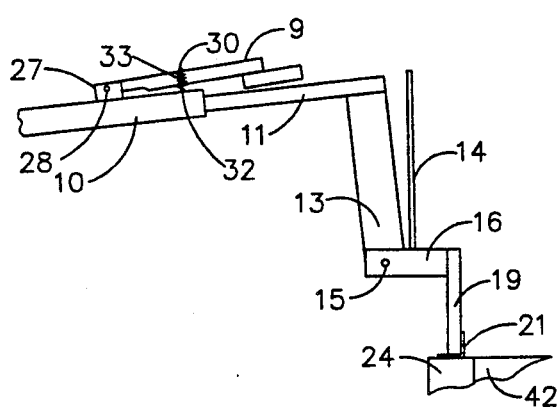

ND BOAT/YACHT
TRAILERED CRADLE AND BOAT/YACHT MANAGING METHOD

REFERENCES TO RELATED APPLICATIONS

This application is a continuation-in-part of the application with Ser. No. 07/458,519, U.S. Pat. No. 5,004,260, filed Dec. 28, 1989. The earlier filing date of this application is hereby claimed.

The following is an Improvement Patent Application over my patent application with Ser. No. 07/458,519 U.S. Pat. No. 5,004,260, filed Dec. 28, 1989. My patent application with Ser. No. 07/458,519 is an Improvement Patent Application over my patent with U.S. Pat. No. 4,911,459, filed Feb. 2, 1989.

BACKGROUND OF THE INVENTION

1. Field of the Invention

This invention relates generally to cradled marine vessels in combination with boat trailers and more specifically to an improved means for launching and retrieving the cradled marine vessels.

2. Prior Art

My Launcher/Retriever Cradle for Trailered Boats, U.S. Pat. No. 4,911,459, provided, for the first time ever, a method for completely separating a cradle from the bed of a trailer while always maintaining the cradle longitudinally aligned with the trailer bed. The cradle is launched from and retrieved upon the trailer by an elongate push/pull rod. The rod is pivotally attached to a forward end of the cradle. Launcher and retriever cables are attached to the rod and reverse wound on a reversible drum winch such that the cabling system will push the rod rearward upon the trailer and pull the rod forward upon the trailer. Although this type push/pull rod and cabling system provides a useful and effective method for launching and retrieving a trailered cradle, a disadvantage exists in that the rod has to be quite elongated to prevent submerging the trailer in water during launching. Two more disadvantages of my first push/pull rod are the rod coming into contact with the stabilizer platform member of the device and the launcher and retriever cable pulleys mounted on the forward end of the trailer.

My Trailered Boat Cradle, U.S. Pat. No. 5,004,260, filed Dec. 28, 1989, provided, for the first time, a telescoping push/pull rod member of a trailered boat cradle.

Although my telescoping push/pull rod provides a useful and valuable method for launching and retrieving a trailered cradle, a disadvantage exists in that the length of the telescoping push/pull rod is and has to be limited. Another disadvantage of my telescoping push/pull rod is that it also comes into contact with the stabilizer platform member of the device.

I wish to mention that my telescoping push/pull rod does provide a longitudinally compact device.

It is apparent that progress needs to be made concerning our management of trailered marine vessels. Commercial crabbers, oyster collectors, clam diggers, shrimpers, fishermen, boaters in general, to include yachtsmen, and persons responsible for emergency vessels experience some degree of difficulty at the boat landing.

Parisi's Extendable Trailer for Marine Vehicles, U.S. Pat. No. 4,626,162, Whaley's Self-Leveling Boat Trailer, U.S. Pat. No. 4,395,185, Ernst and Davis, U.S. Pat. No. 5,013,206, and my U.S. Pat. No. 4,911,459 and U.S. Pat. No. 5,004,260 represent some of the on going efforts directed toward solving the numerous problems associated with trailered marine vessels.

A need obviously exists to bring about unprecedented improvements in the management of trailered marine vessels.

My hereinafter described break-back fold up/out cradle governor will provide an even more longitudinally compact trailer and boat cradle combination than is provided by my telescoping push/pull rod and will also provide an improved invention wherein a cradle is even further separated from a trailer.

There is no known break-back fold up/out cradle governor in combination with a launcher/retriever cradle for trailered boats or a trailered boat cradle.

SUMMARY AND OBJECTS OF THE IMPROVEMENT INVENTION

The above mentioned problems in the prior art have been overcome by the present improvement invention wherein;

A boat keel support platform member of a trailered cradle has an elongate second section member of a cradle governor pivotally connected to a forward end thereof. A more elongate first section of the governor is hinged to the opposite unconnected end of the governor second section. If desired and used, a launcher cable is attached at the forward end of the governor first section. The launcher cable extends along the governor and trains about launcher pulley means installed near the rear end of the trailer. The launcher cable then extends forward to a reversible drum winch, or to a separate launcher winch, after having also trained about pulley means installed near the forward end of the trailer. A retriever cable is also attached to the governor first section, the attachment point for the retriever cable being positioned near to and disposed below the governor first section hinge components. The retriever cable then extends forward from the governor to the drum winch or other provided winch. An extendable governor lift is pivotally connected to the forward end of the governor first section, the other end of the lift being pivotally connected to a bracket positioned at a forward location on the trailer. Pulling upon the retriever cable will at a precise dynamic point of operation result in the governor forward section being forcefully folded upward. During launching, whether or not a launcher cable is involved, the lift causes the governor first section to unfold until reaching a prone position, the prone governor resting upon skid platform means associated with the trailer. Moments after the moving governor has reached the prone position, slider members of the forward end of the governor are slidingly captured by a track combined with the trailer.

It is a principal object of this improvement invention to provide a marine vessel launching and recovering method such that a cradle supporting trailer does not enter the water when the cradle member of the trailer is launched.

It is another object of this improvement invention to launch and recover large marine vessels, such as a yacht, even though the trailer may have to be partially or completely submerged during such launching and recovery operations.

Another object of this invention is to limit the tilt of a cradle supporting trailer during launching or anytime the cradle is shifted reward upon the trailer.

Yet another object of this invention is to make the launching and retrieving of a marine vessel a one man operation—even when launching and retrieving deep draft marine vessels.

Still another object of the invention is to provide general boaters, yachts-men, commercial fishermen, persons required upon the waters, and the military, to include the Army Corp of Engineers, the U.S. Coast Guard and the U.S. Navy, with a much improved method of managing trailered marine vessels—especially under adverse cold weather conditions.

Yet still another object of this improvement invention to provide a less burdensome trailer hitching method by having finger tip command over the center of gravity of the device.

A general object of this improvement invention to provide a trailered marine vessel managing system that is worthy of the twenty-first century.

Yet another general object of this improvement invention is to remove more marine vessels from the waters for ecologic reasons.

Finally, it is an object of this invention to inspire persons who generally do not care to be bothered by the numerous tasks associated with marine vessels to have a positive change in attitude toward boating.

Other objects, features and advantages of my improvement invention will be readily apparent from the following description of the preferred embodiments thereof taken in conjunction with the accompanying drawings, wherein like reference characters refer to like parts, although variations and modifications of the improvement invention may be effected without departing from the spirit and scope of the novel concepts of the disclosure.

BRIEF DESCRIPTION OF THE DRAWINGS

FIG 4 is a view taken along the line 4—4 of FIG. 3, the view having break-away sections for clarity in the drawing.

FIG. 5 depicts a partial side view of hinged first and second sections of the governor.

FIG. 6 is a sectional view taken along the line 6—6 of FIG. 5.

FIG. 7 is a partial side view of the hinged first and second sections of the governor and shows the first section of the governor in a folded up attitude.

FIG. 8 is a partial side view of the lift maintaining the governor in a slightly folded attitude.

FIG. 9 depicts a view similar to FIG. 8 and shows the latch member of the lift in the unlocked position.

FIG. 10 depicts a view similar to FIGS. 8 and 9 and shows the relationship between the latch member of the lift and the lift when the lift is slightly extended.

DESCRIPTION OF THE PREFERRED EMBODIMENTS

It is to be hereinafter understood that numerous conventional boat trailers can be modified and combined with previous and hereinafter described components that make up the improved invention. A wheeled chassis, to mean a component of a boat trailer, is hereinafter described for the purpose of presenting a complete and operational improved invention. No effort is being made to invent an improved boat trailer.

Figure 28:
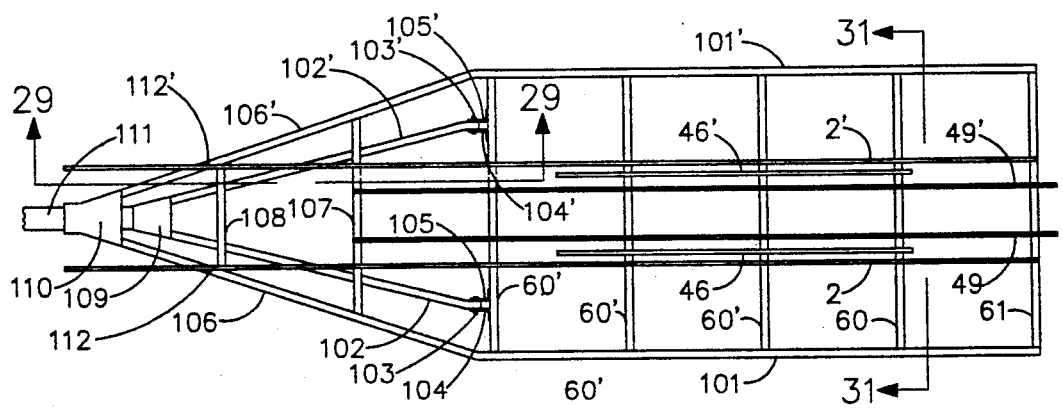
FIG. 28 depicts a top view of a chassis member of a trailer having a pivotally connected tongue member, the view also showing tracks mounted upon the chassis.
Figure 29:
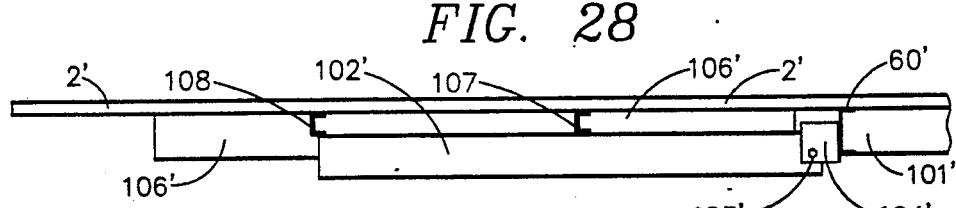
FIG. 29 depicts a partial sectional side view taken along the line 29—29 of FIG. 28.
Figure 30:
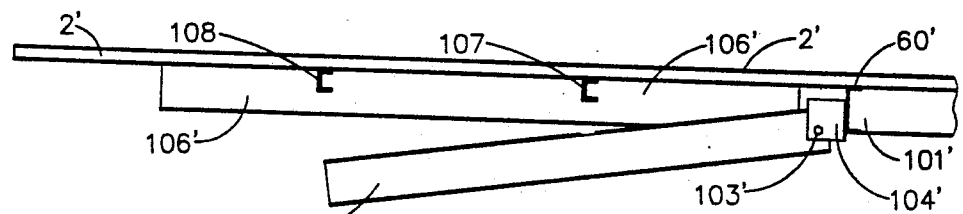
FIG. 30 is a view similar to FIG. 29 and shows a member of the tongue member of the trailer slightly rotated, the chassis being tilted.
Figure 31:
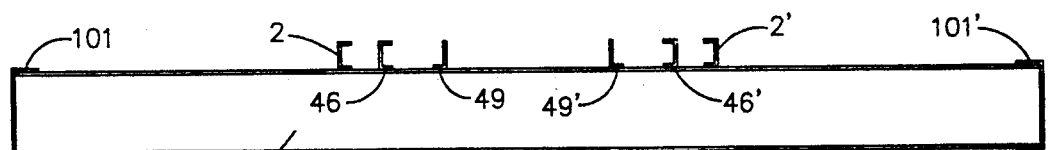
FIG. 31 depicts a rear view taken along the line 31—31 of FIG. 28, and shows that the preferred track members of the chassis are common channel stock and that roller bracket supporting members of the chassis are common angle iron.
Figure 32:
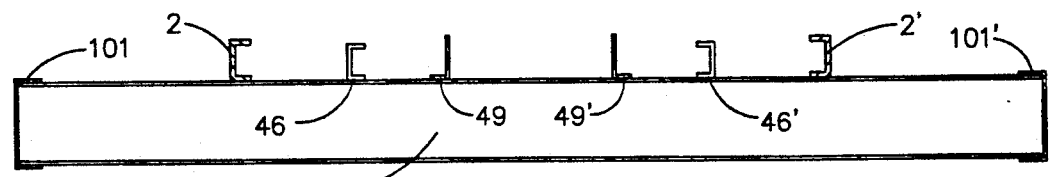
FIG. 32 depicts a view similar to FIG. 31, the view being presented to emphasize the fact that component dimensions vary according to material strengths essential for managing diverse vessel displacements.
Figure 33:
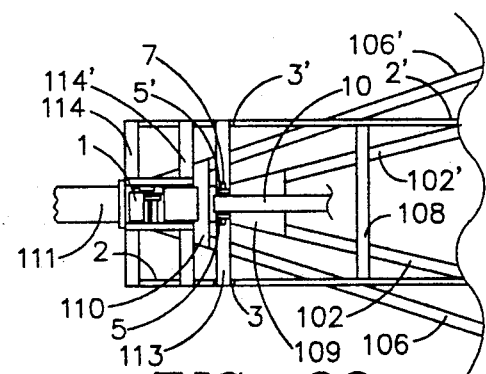
FIG. 33 depicts a partial top view of a forward area of the trailer and shows a winch and bracket means supporting a pivotally connected governor lift.

Referring to the figures in general and to FIG. 28 in particular, shown is a top view of a conventional type wheeled chassis having longitudinally spaced apart cross members 61, 60, 60' joined to elongate laterally spaced apart side members 101, 101'. Longitudinally spaced apart cross members 107, 108 are joined to elongate converging side members 106, 106' of the chassis, the converging side members of the chassis being rigidly joined together at their point of convergence by the tow bar 111 housing stiffener 110. Converging members 102, 102' of the chassis tow bar 111 (trailer tongue 111) are rigidly united with the tow bar 111 at their point of convergence by the tow bar stiffener 109. The tow bar 111 member of the chassis is pivotally connected to the chassis by conventional brackets 104, 105, 104', 105' and pins 103, 103', the pins being disposed through the apertured brackets and the apertured near ends of the bifurcated converging tow bar members 106, 106'. A quick glance at FIGS. 26 and 48 will show tow bars including conventional hitcher components such that the hitcher components of the tow bars (trailer tongues) are obviously releasably connected to a towing vehicle 93, 158. FIG. 28 shows hereinafter described tracks 2, 2', 46, 46' and preferred angle iron primal and secondary bracket supports 49, 49' combined with and mounted upon the chassis. FIG. 29 is a side view showing the tow bar component 102' pivotally connected to a lateral cross member 60' of the chassis. FIG. 30 shows the tow bar member 102' slightly rotated about a pivot point to show conventional means for having a tiltable chassis provided by the conventional means for pivotally attaching the tow bar to the chassis. The chassis is also shown as being slightly tilted in FIG. 30, as FIGS. 28, 29 and 30 represent components of a conventional break-back trailer. Except for those trained in the art, FIGS. 31 and 32 are shown to emphasize the fact that any or all components of the invention are dimensioned to withstand forces determined by the massiveness of hereinafter mentioned marine vessels to be cradled and trailered.

Figure 16:
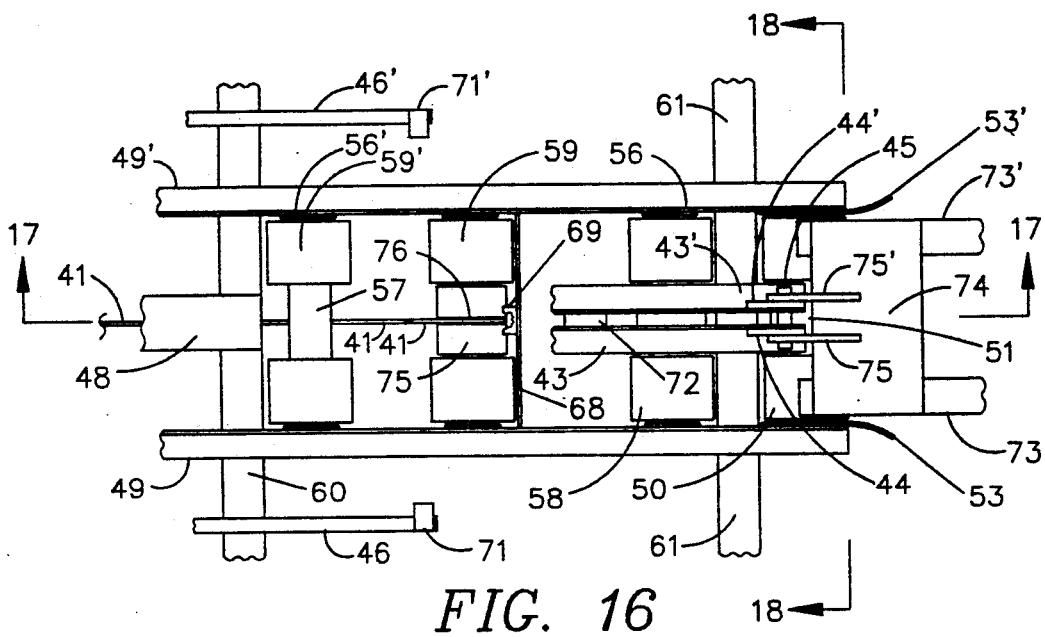
FIG. 16 depicts a partial cut-away top view of retriever cable pulley means, governor stops, and pivotal connecting means between the governor and a keel support platform.
Figure 17:
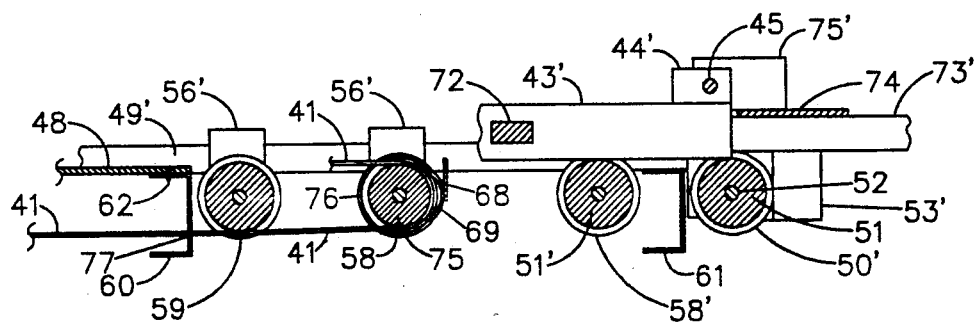
FIG. 17 depicts a partial sectional view taken along the line 17—17 of FIG. 16.
Figure 18:
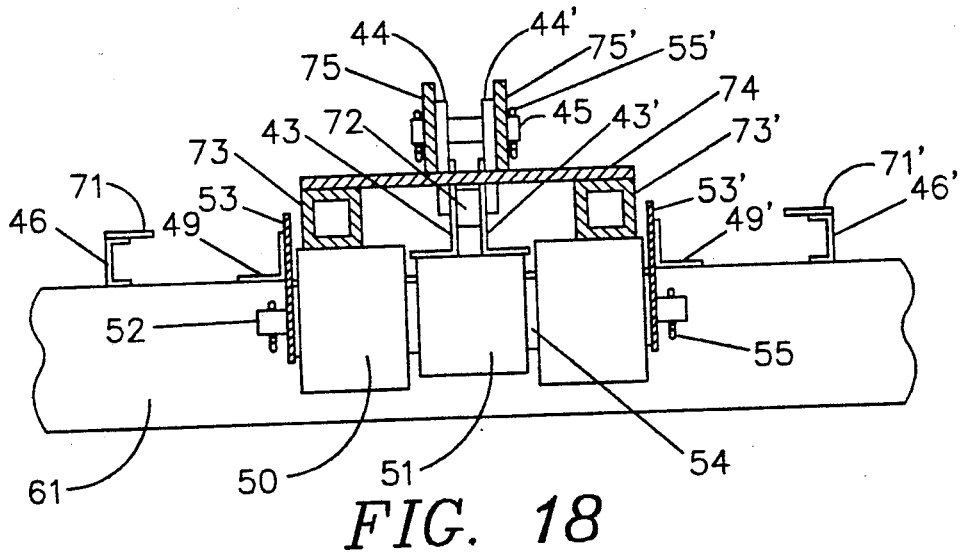
FIG. 18 depicts a partial sectional view taken along the line 18—18 of FIG. 16.

Viewing FIGS. 16, 17 and 18, especially FIG. 18, a pair of laterally spaced-apart primal rollers 50, 50' are shown sandwiching a smaller diameter pilot roller 51, the primal rollers and the pilot roller being rotatably mounted upon an initial axle 52 and having preferred spacer washers such as washer 54 separating the secondary rollers. A pair of laterally spaced-apart primal guide brackets 53, 53' are shown supporting the initial axle 52. Preferred cotter pins such as pin 55 are disposed through apertures arranged through the near ends of the axle 52 and maintain the axle 52 between the primal guide brackets 53, 53'. All hereinafter mentioned axles are maintained between supporting brackets using the preferred cotter pin to secure the axles to the brackets. The brackets 53, 53' are preferably welded to substantially rigid elongated parallel angle iron members 49, 49' mounted upon the cross members of the chassis such that the primal guide brackets 53, 53' are, in their laterally spaced-apart attitude, medially arranged and indirectly attached at a rear distal position upon the wheeled chassis. Lateral cross member 61 is the rear most cross member of the chassis. Of course, the initial axle 52 is laterally arranged with respect to the wheeled chassis.

Again viewing FIGS. 16, 17 and especially FIG. 18, the primal guide brackets 53, 53' are shown having inward facing surface areas extending above the primal rollers 50 such that the boat keel support platform, via boat keel support platform members 73, 73', is resting upon the primal rollers 50 and aligned between the inward facing surface areas of the primal guide brackets 53, 53'. The outwardly bent rear edges of the primal guide brackets give added assurance that a forward moving keel support platform will not be snagged by the brackets.

Figure 1:
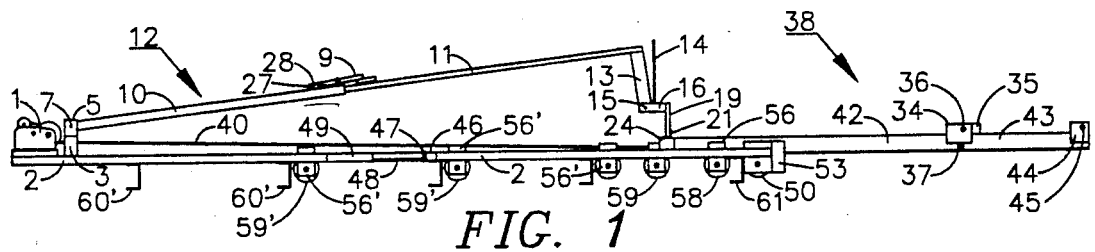
FIG. 1 depicts a side view of an extended governor lift pivotally attached to cantilevered forward members of a governor, several roller members of a trailer and a winch.
Figure 2:
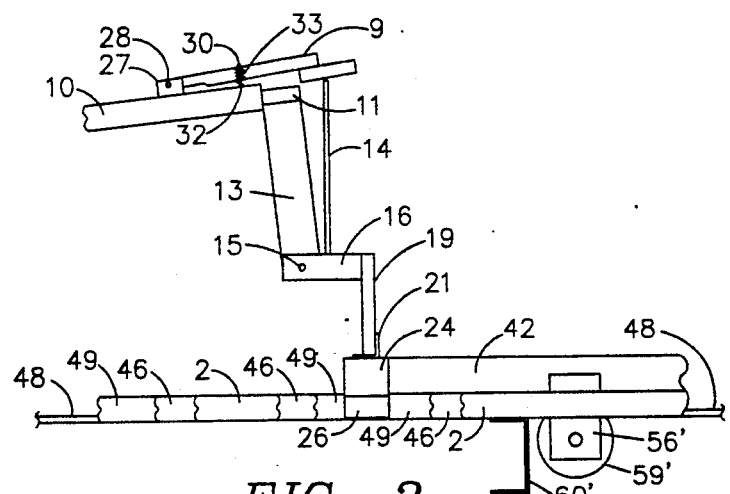
FIG. 2 depicts a partial side view of cantilevered members of both the lift and the governor pivotally joined together and latching means associated with the lift and governor.

Viewing FIGS. 1, 16 and 17, rollers 58, 58' and 51' are similar to the mentioned Primal rollers 50, 50' and are rotatably supported upon a secondary axle which is supported by pairs of laterally spaced-apart alignment brackets 56, 56'. This secondary axle and all secondary axles are laterally arranged with respect to the wheeled chassis. These and all hereinafter mentioned alignment brackets have inward facing surface areas extending above all rollers such that a keel support platform resting upon the primal and secondary rollers is aligned between the inward facing surface areas of the alignment brackets.

Viewing FIGS. 1, 2, 3, 12, 13, 16 and 17, a plurality of pairs of laterally spaced-apart secondary rollers 59, 59' are shown, and each pair of the secondary rollers are rotatingly mounted upon a secondary axle 52'. A pair of laterally spaced-apart alignment brackets 56, 56' support each of the secondary axles, this pair of brackets and the shown like kind brackets being attached upon the chassis by being welded to the bracket supports 49, 49'. Viewing FIG. 16, an elongate spacer 57 is shown separating a pair of secondary rollers 59'. All pairs of rollers forward of this mentioned pair of rollers also have like kind spacers separating each of the pairs of secondary rollers. At this time I mention that a person skilled in the art would easily determine the number of pairs of rollers to install on a trailer based upon the massiveness of the cradled marine vessel to be trailered.

Viewing FIGS. 1, 2, 3, 4, 13, 16, 17 and 45, shown is an elongated skid platform 48 longitudinally arranged and attached to cross members of the chassis. As best shown in FIG. 4, preferred self tapping metal screws 62', the screws being counter-sunk into the platform, are used to secure the platform 48 upon appropriate cross members 60' of the chassis. The skid platform 48 is medially arranged between the laterally spaced-apart secondary rollers and is a support for the hereinafter described cradle governor.

Figure 3:
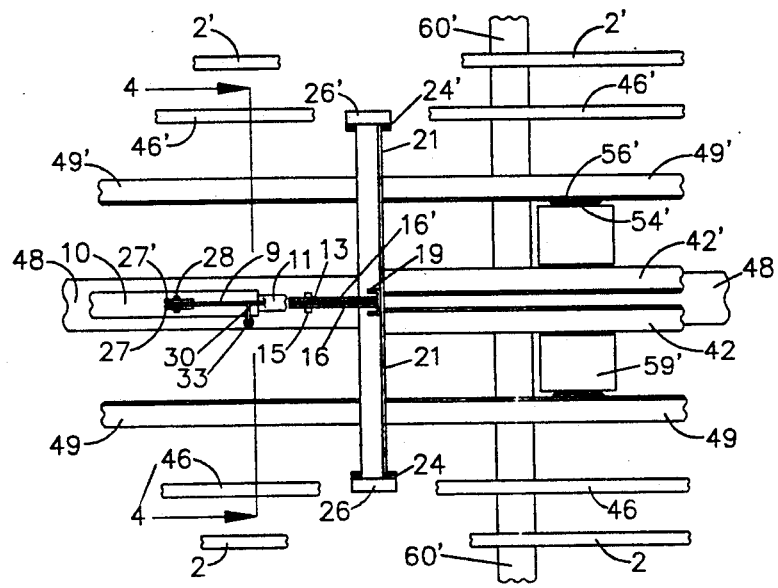
FIG. 3 depicts a partial top view of FIG. 2 with breakaway sections for clarity in the drawing.
Figure 11:
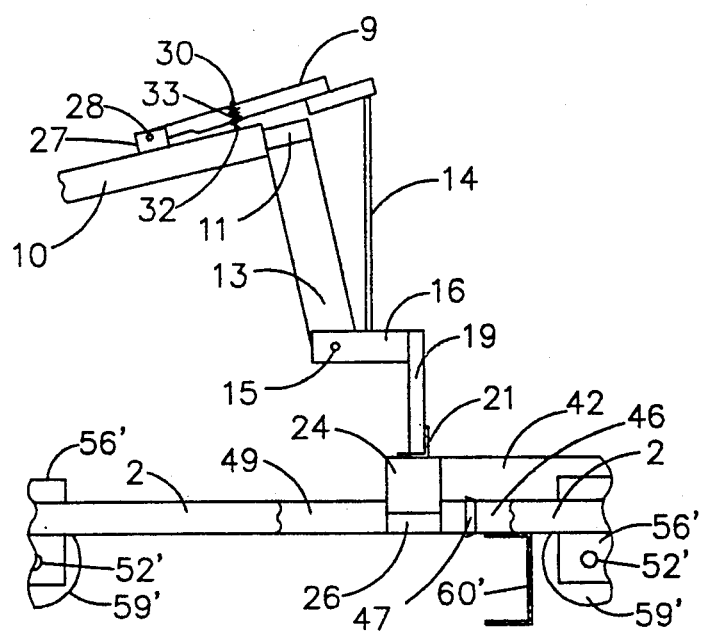
FIG. 11 depicts an enlarged partial side view of the relationship between the lift and governor just prior to slide members of the governor being slidingly captured by track capture means associated with the trailer.
Figure 12:
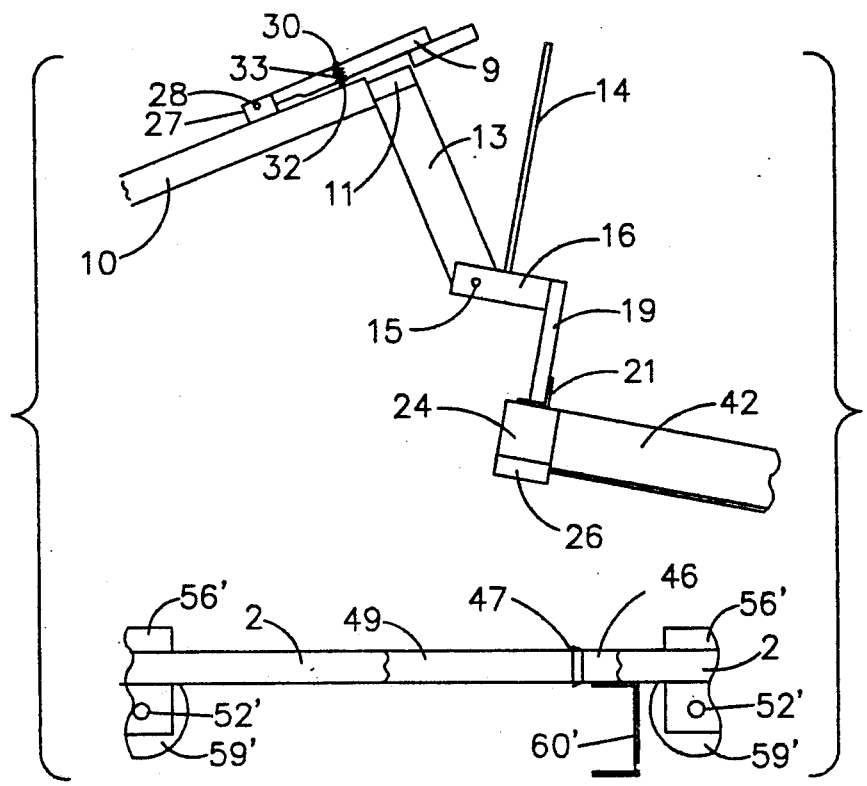
FIG. 12 depicts an enlarged partial view of the lift just after the governor section is slightly folded or just before the governor first section reaches a prone position.

Viewing FIGS. 1, 2, 3, 4, 11, 12, 16, 18, 28, 31, 32, 33, 34, 38, 39, 40 and 41, especially FIGS. 3 and 28, shown are first and second tracks, each track including two elongate longitudinally arranged parallel members 2, 2', 46, 46' that are preferably welded to cross members of the wheeled chassis. Preferably, the track members 2, 2', 46, 46' are common elongate sections of channel stock. Viewing FIGS. 11 and 12, shown is the common channel stock track member 46 having three edges bent outward such that the forward end of the track forms a bellmouth like receiver 47. A like kind bellmouth like receiver is formed on the forward end of the other member 46' of the track and as will hereinafter be described, these bellmouth like receivers will capture slider members 26, 26' of a cradle governor.

Figure 13:
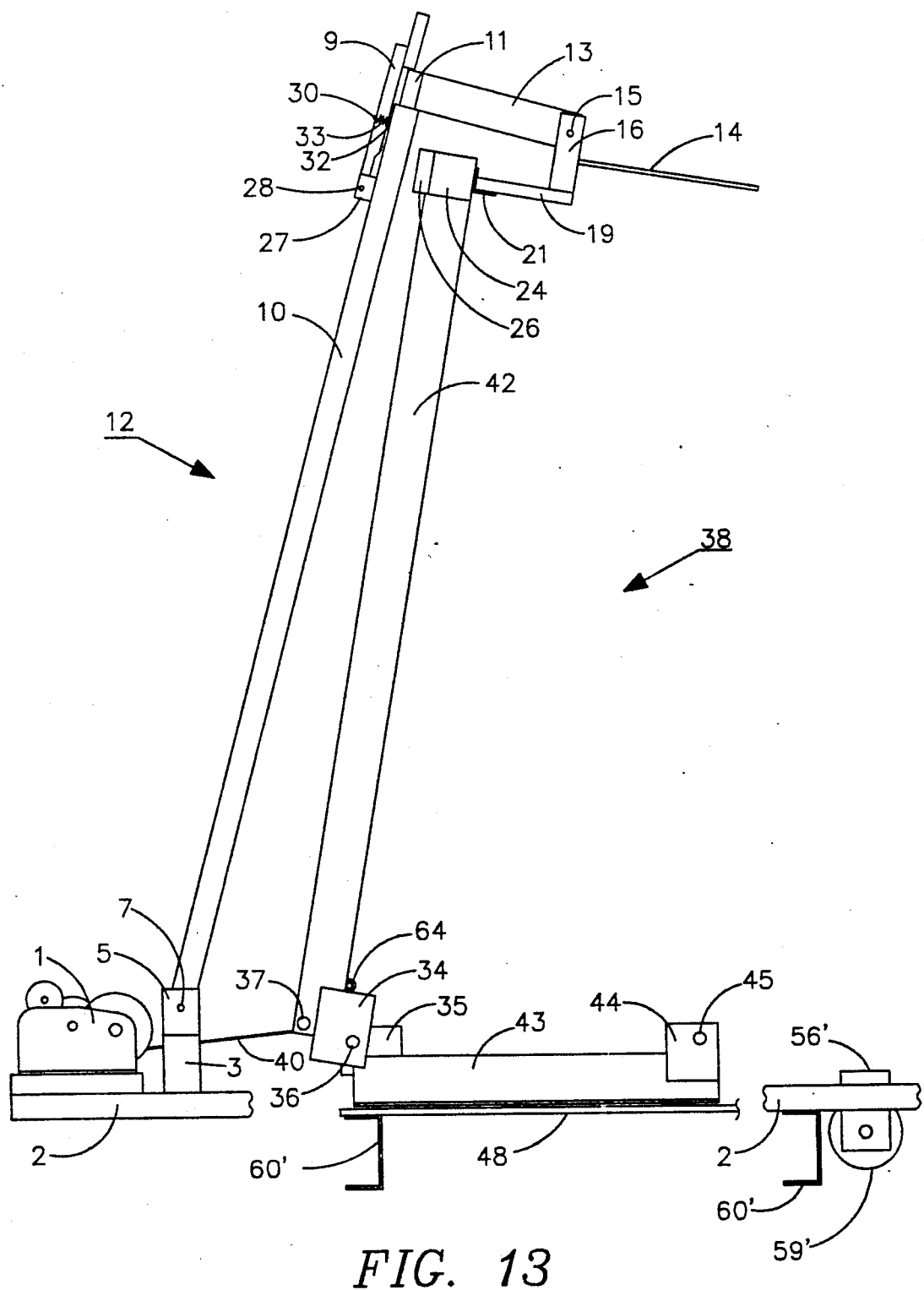
FIG. 13 depicts an enlarged side view of the lift, governor, winch and retriever cable extending from the winch to the governor.

Viewing FIGS. 1, 3, 4, 5, 6 and 13, especially FIG. 13, shown is a break-back, fold up/out cradle governor 38, the cradle governor 38 including first 42, 42' and second 43, 43' elongate sections of rigid material, and as best shown in FIGS. 1 and 13, the governor 38 second section 43, 43' is less elongate than the governor 38 first section 42, 42'. The first and second sections of the governor are each two equivalent segments 42, 42', 43, 43' of corrosion resistant galvanized angle iron placed longitudinally side-by-side, the segments having laterally spaced-apart opposing flat surface areas welded in place using welded spacers such as the spacer 72 shown in FIGS. 16 and 17. Viewing FIGS. 1, 5, 6 and 7, shown are the governor first and second sections of rigid material hinged together such that end surface areas of the governor first and second sections of rigid material are abutting. FIG. 6 taken along the line 6—6 of FIG. 5 shows apertured plates 34, 34' preferably welded to the sides of the governor first section angle iron members 42, 42' shown in FIG. 4, such that portions of the apertured plates 34, 34' extend above and rearward of the governor first section. A third heavier and thicker apertured spacer plate 35 is shown welded between the laterally spaced apart segments 43, 43' of the governor second section such that this third plate 34 has portions extending above and forward of the governor second section. When the end surface areas of the governor first and second sections are abutting, the apertures through the plates 34, 34' are aligned with the aperture through the third plate 35 and a pin 36 is disposed through the apertures, the preferred cotter pins 55, 55' being disposed through apertures at the near ends of the pin 36. FIG. 7 shows the hinge effect. It is important to notice that the governor first section will fold upwardly only.

Viewing FIGS. 16 and 18, the rear distal end of the governor second section 43, 43', including apertured plates 44, 44', is shown pivotally connected to the forward end of the keel support platform, the platform including members 73, 73', 74, and the apertured plates 75, 75'. The governor second section plate members 44, 44' are preferably welded to the governor segments 43, 43' such that the plates 44, 44' extend above the segments 43, 43'. The keel support platform plates 75, 75' are preferably welded to the keel support platform stiffener plate 74. When the apertures through the plates 44, 44' are aligned with the apertures through the plates 75, 75' and a pin 45 is disposed through the apertures, the cradle governor second section is pivotally connected to the forward end of the keel support platform such that the governor is supported upon the previously described pilot roller 51, FIGS. 16, 17 abd 18, and captured between the previously mentioned primal rollers 50, 50'. Notice that the governor is always supported upon the pilot roller 51 when the keel support platform, moving rearwardly, relinquishes support upon the primal rollers 51, 51'.

Viewing FIGS. 2, 3, 4, 11 and 12, shown is a pair of opposing sliders 26, 26' attached, preferably by welding, at end points of a cross member 21 of the governor first section of rigid material. The cradle governor first section cross member 21 is preferably welded in place and the cross tee vertically arranged slider supports 24, 24' shown supporting the sliders 26, 26' at the end points of the cross member 21 are welded below the distal lateral ends of the cross member 21 of the governor.

Figure 14:
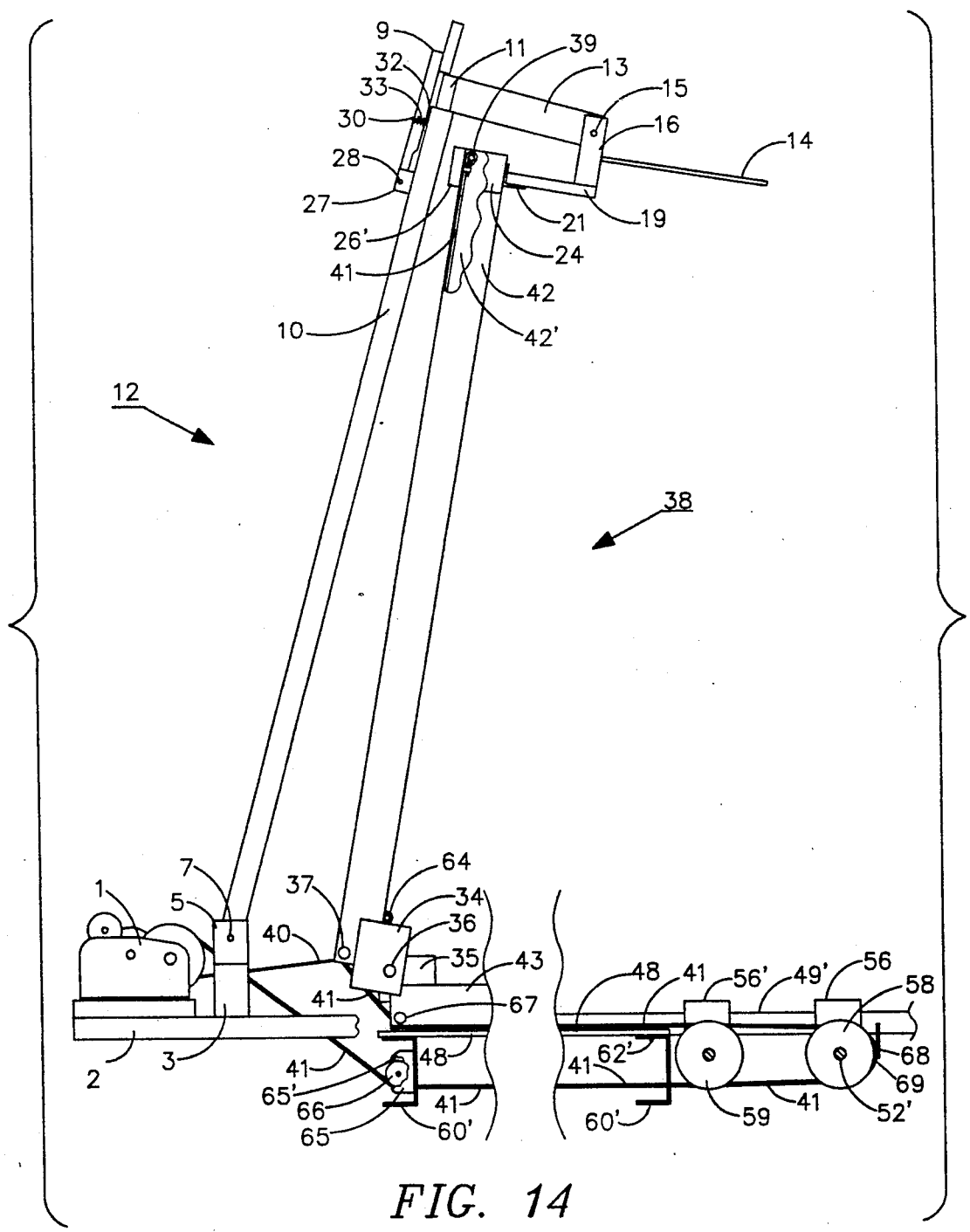
FIG. 14 is a view similar to FIG. 13, the view additionally showing a retriever cable attached to the forward end of the folded governor and extending from the governor to winching means via retriever cable pulley means. Also shown are cable guides associated with the pulley means.
Figure 15:
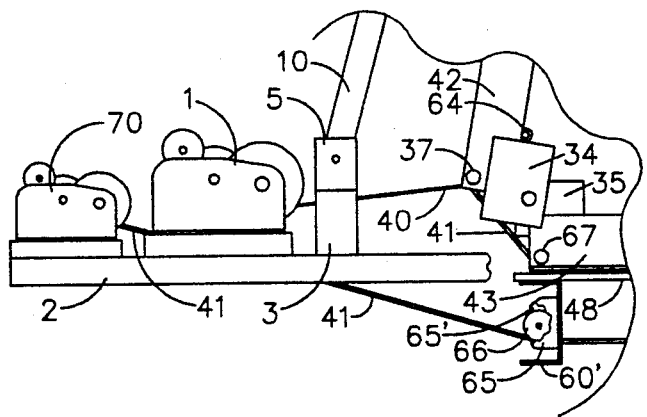
FIG. 15 depicts a partial side view showing separate launcher and retriever winches being employed upon the device.

Viewing FIGS. 14, 15, 16 and 17, FIG. 14 shows a launcher cable 41 attached to a first cable connecting point 39 at the forward end first cable tie point on the cradle governor 38 first section. The launcher cable 41 is shown extending along and from the cradle governor first section, having trained about the governor first section guide pin 37 and the governor second section guide pin 67, training about a modified roller serving as a launcher pulley 75 located near the rear end of the trailer, FIGS. 16 and 17, passing through apertures in lateral cross members 60, 60' of the trailer, training about a second launcher puller 66, FIG. 14, and returning to a reversible winch, FIG. 14. Alternately, as shown in FIG. 15, the launcher cable 41 returns to an independent launcher winch 70 should it be undesirable to have a reversible winch installed upon the trailer. FIGS. 14, 16 and 17 show a preferred pilot like roller 75 having a cable groove 76, FIG. 16, and a cable guide 69 mounted on a lateral cross support 68, the cable guide 69 preventing the launcher cable 41 from inadvertently "jumping track". Also shown in FIGS. 14 and 15, the pulley 66 side supports 65, 65' prevent the launcher cable from inadvertently "jumping track".

It should be mentioned at this time that a launcher cable and associated launcher cable winching means are not always necessary components of this improvement invention. When the break-back trailer is tilted towards the water, or the ground, the cradle will roll off the trailer—dangerously rapidly. A quick glance at FIG. 42 will show a retriever cable winch 150 having a useful, if not necessary, conventional clutch control knob. Releasing the retriever cable winch clutch, the trailer being tilted towards the water, or ground, will provide means for one person to launch a boat.

Viewing FIGS. 13, 14 and 15, a retriever cable 40 is shown extending from the reversible winch 1 and also attached to the cradle governor first section. The cable 40 is shown training about the guide pin 37 member of the cradle governor first section, extending between the spaced-apart governor segments 42, 42' and attached to a floating pin 64 located on top of the cradle governor first section. As shown, the retriever cable is attached to a retriever cable tie point on the governor first section of rigid material such that the tie point is effectively disposed below the apertured hinge members of the governor first section of rigid material. It should be noticed at this time that this preferred method of attaching the retriever cable to the governor first section does not interfere with the folding property of the cradle governor; rather, in fact, this method of attaching the cable to the governor assist with the desired folding of the governor.

Figure 42:
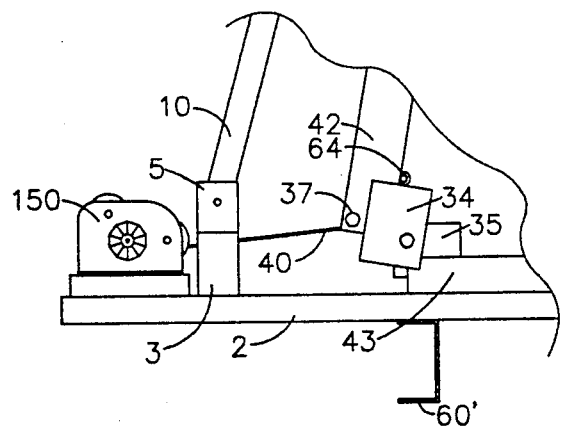
FIG. 42 depicts a partial side view of a forward area of the trailer and is presented to emphasize that a clutch is useful if not necessary when a single winch is combined with the invention.

FIG. 15 shows a conventional launcher cable winch 70 and a retriever cable winch 1 combined with the invention. FIG. 42 shows a conventional retriever cable 40 winch 150 having a clutch for releasably locking the cable reel component of the winch. As shown, winch means for the invention comprises independent launcher and retriever winches.

Launcher and retriever cable lengths are received and housed in the longitudinally medially arranged trench like spaces along the bottom surfaces of the governor first and second sections, the trench like space being provided by the spaced-apart cradle governor segments. Having launcher and retriever cables housed between the governor first and second sections of rigid material which are formed to provide trench like spaces along the bottom surfaces thereof for receiving and housing the lengths of the launcher and retriever cables prevents mashing the cables between the governor and the skid platform and the undesirable dragging of the cables along the skid platform when the cradle governor is in a prone position and sliding along the mentioned skid platform member of the trailer. The skid platform is a preferred method of supporting the cradle governor upon the trailer and is less costly than having the cradle governor on rollers.

Viewing FIGS. 1, 2, 3, 4, 8, 9, 10, 11, 12, 13 and 14, shown is an elongated extensible cradle governor lift 12, FIG. 1, including a rigid elongate tubular housing 10 having a rigid elongate tubular insert 11 slidingly inserted within a first open end of the tubular housing. The elongate tubular insert member 11 of the cradle governor lift 12 has a cantilevered boost member 13 forming a distal rear end thereof. The boost member 13 of the tubular insert is preferably welded perpendicular to the tubular insert 11 and a surface area of the boost 13 near the weld joint serves as a stop when the boost member 13 of the tubular insert 11 comes into contact with a surface area adjacent the first open end of the tubular housing 10 member of the lift 12. An aperture is drilled through the near distal end of the cantilevered boost member 13 of the tubular insert 10 member of the lift 12. Also shown is a cantilevered lift bar 19 member of the first section of the cradle governor. The cantilevered lift bar 19 member of the governor first section is in an upright position relative to a horizontal, or prone positioned cradle governor and is welded to the cross bar 21 member of the cradle governor. Elongate laterally spaced-apart flat stock plates 16, 16', the plates 16, 16' serving as a type bracket, are welded perpendicular to the forward near upper end of the cantilevered lift bar 19 member of the cradle governor. The free end areas of the spaced-apart flat stock plates have laterally arranged apertures drilled therethrough. Placing the apertured end of the boost 13 member of the tubular insert between the flat stock plates 16, 16' such that the apertures through the flat stock plates 16, 16' are aligned with the aperture in the boost 13 member of the tubular insert 11 and having a pin 15 disposed through the apertures provides a boost 13 member of the tubular insert 11 that is pivotally joined to a cantilevered lift bar 19 member of the cradle governor 38. The lift bar 19, having the plates 16, 16' welded thereto, forms an upper forward member of the cradle governor first section of rigid material. The free and second end of the tubular 10 housing member of the governor lift 12 is apertured and the aperture through the free end of the tubular housing 10 member of the governor lift 12 is aligned with apertures through bracket members 5, 5' of the trailer and a pin 7 is disposed through the aligned apertures. Now the second free end of the tubular housing 10 member of the governor lift 12 is pivotally attached to bracket 5, 5' members of the wheeled chassis, the bracket members 5, 5' of the wheeled chassis being medially located and attached at a forward location upon the wheeled chassis.

Viewing FIGS. 1, 2, 3, 8, 9, 10, 11, 12, 13 and 14, a spring-loaded latch is shown, the base 27 of the latch being welded to a forward top surface area of the tubular housing 10 member of the cradle lift 12 and having the catch bar 9 member of the latch pivotally attached to the base 27 via a pin 28 disposed through base 27 and catch bar 9 aligned apertures. The helical tension spring 33 member of the latch is stretched between protruding members 30, 32 of the catch bar 9 and the tubular housing 10 member of the governor lift 12. The latch is locked onto the tubular insert 11 member of the governor lift 12 via the catch bar 9 locking onto an end surface area of the insert 11 member of the governor lift 12 preventing the insert 11 from slidingly extending from within the tubular housing 10 when the cradle governor lift 12 is maintaining the cradle governor 38 in a break-back and folded attitude. A catch bar contact arm 14 member of the cradle governor 38 comes into sliding pushing uplifting contact with the catch bar 9 member of the latch forcing the rotated catch bar 9 to unlock, or disengage, from the insert 11 member of the governor lift 12 only when the cradle governor 38 is near a prone position upon the skid platform 48.

Viewing FIGS. 1, 11, 12 and 13, winching the prone governor 38 forward from the position shown in FIG. 1, the governor 38 will reach the position shown in FIG. 11. In FIG. 11 the slider(s) 26 have exited the track member(s) 46 and are just forward of the bellmouth like slider receiving ends(s) 47 of the track member(s) 46 and the boost 13 member of the lift, acting as a stop, prevents the further forced insertion of the insert 11 into the housing 10. The catch bar contact arm 14 has contacted and rotated the catch bar 9 unlocking the catch bar 9 from the insert 11. At this time the now elongate rigid governor lift 12 is a radius bar like device having a forward end pivotally attached to a forward end of the wheeled chassis and a rearward end pivotally attached to the forward end of the governor. Continued forward winching of the cradle governor forces the governor first section to rotate upwards, FIG. 12, the spring-loaded latch locking onto the insert 11, the rigid lift 12 providing the radius length for the axis of rotation of forward components of the governor first section. Continued forward winching of the governor until the keel support platform is retrieved to a forward position upon the wheeled chassis and resting upon the primal and secondary rollers results in the lift finally maintaining the governor in a break-back and folded attitude, FIG. 13.

Viewing FIGS. 10, 11, 12 and 14, beginning rearward movement of the governor, including of course the keel support platform, results in the governor beginning to unfold, the latch preventing the insert 11 from slidingly extending from within the tubular housing 10 member of the lift. Continued rearward movement of the governor and keel support platform will result in the governor reaching a prone folded out position upon the skid platform. Continued rearward movement of the governor and keel support platform results in the slider members of the governor being received/captured by the governor track, the sliders being guided into channels of the track members via the bellmouth like receiving ends 47 of the governor track members. Continued rearward movement of the governor and keel support platform will result in the insert 11 extending from within the tubular housing 10 member of the lift 12, FIGS. 10 and 1. The governor and keel support platform can continue to move rearward until the slider support members 24 of the governor cross member 21 come into contact with the governor stops 71, 71', FIG. 18.

Figure 49:
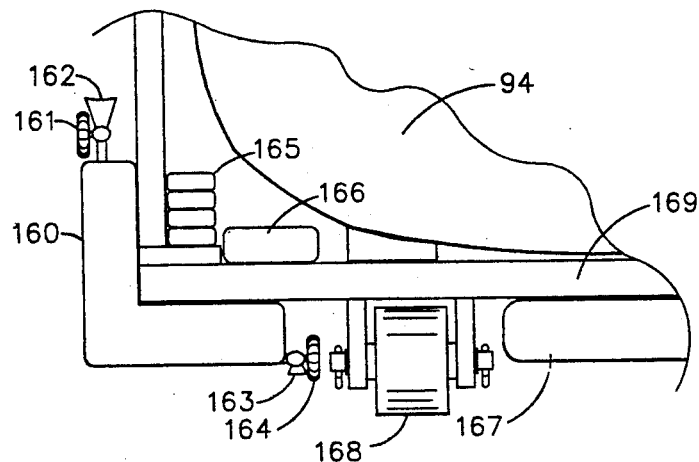
FIG. 49 depicts a partial rear view of a cradle supporting ballast weights and buoyancy tanks for the purpose of showing the simplest of numerous ways for having means for adjusting the buoyancy of the cradle.
Figure 50:
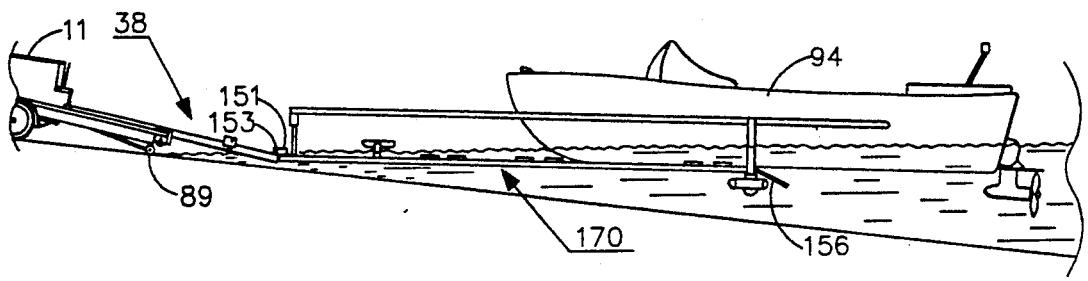
FIG. 50 finally depicts a side view of a boat entering/departing a buoyant launched cradle, the cradle being maintained longitudinally aligned with the trailer vie the sturdy pivotal connection means associated with the cradle and governor, all previous stabilizer components being deleted from this embodiment of the invention.

Viewing FIG. 49, shown is a simple preferred method for controlling and adjusting the buoyancy of the cradle. A rear view of the port side of a cradle 169 and cradled vessel 94 is shown having a ballast like tank 160 attached to the cradle. Also shown is an auxiliary air tank 167 providing additional buoyancy if needed. Preferred weights 165 can be added to the cradle if there is too much buoyancy. The tank 160 has valves with knobs 161, 164 and spouts 162, 163. Water/air is allowed in the tank to suit flotation needs. Like kind tanks and valves are installed on the starboard side of the cradle. Numerous well known and more expensive methods for controlling buoyancy are possible with this invention.

Figure 35:
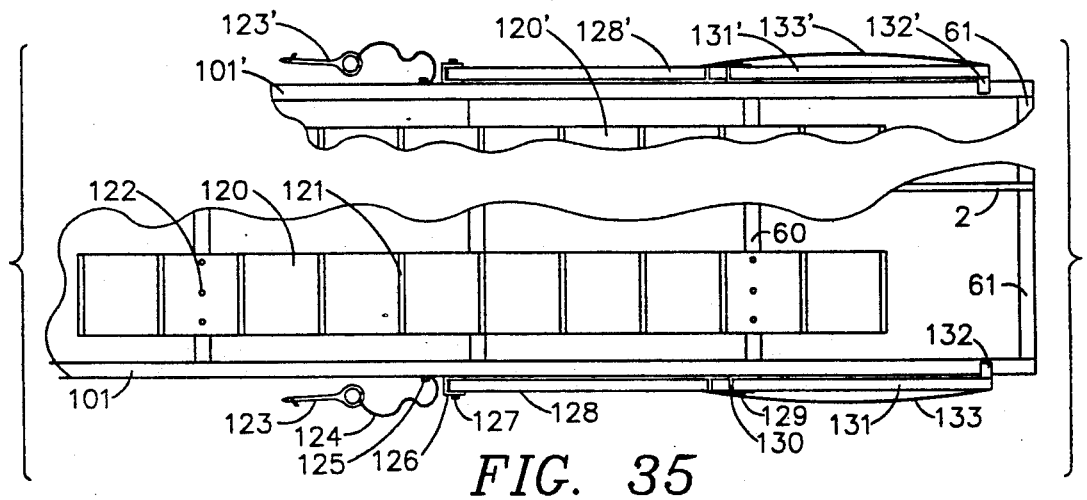
FIG. 35 depicts partial cut-away top views of the chassis having walkway platforms and fold down safety hand rails fixedly attached thereto.

Viewing FIG. 35, walk-way platforms 120, 120' having anti-slip rungs 121 are combined with and attached to the wheeled chassis. Preferred self-tapping screws 122 are used to attache the platforms to lateral cross members of the chassis.

Figure 36:
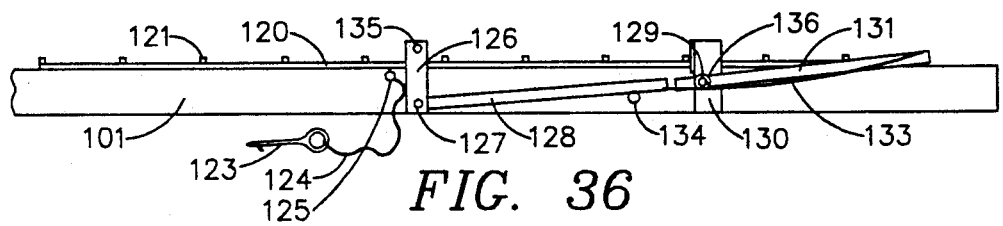
FIG. 36 depicts a partial side view of the chassis and shows the fold down hand rails in a folded down position upon the chassis.
Figure 37:
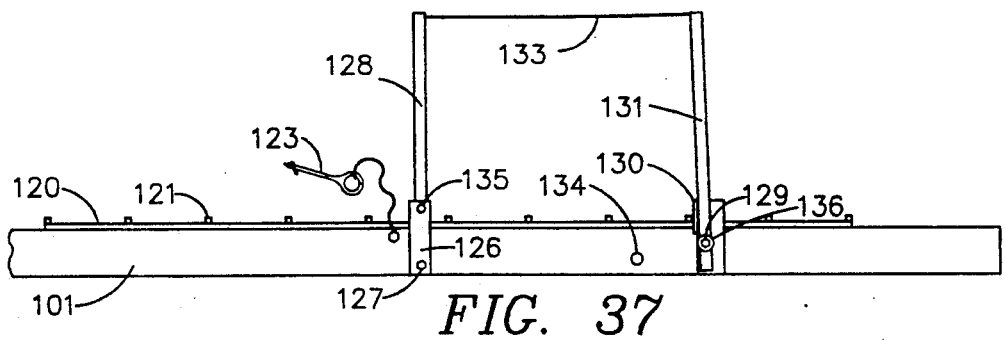
FIG. 37 depicts a view similar to FIG. 36 and shows the safety hand rails in a folded out position.

Viewing FIGS. 35, 36 and 37, fold-away safety hand rails 128, 131 are shown combined with and attached to the wheeled chassis side members 101, 101'. A stop bracket 126 has rail 129 pivotally attached thereto at the point 127 and the stop bracket 130 has hand rail 131 pivotally bolted 129 thereto, a flat washer 136 being placed between the bolt head and the rail. A flexible line 133 extends between the near top ends of the rails 128, 131. In the folded down position rail 128 rest upon the protruding stud 134 and the rail 131 has a protruding member 132 resting upon the chassis. In the folded out, or up, position the linked 124 pin 123 is disposed through aligned apertures 135 drilled through the bracket 126 and the rail 125.

Figure 19:
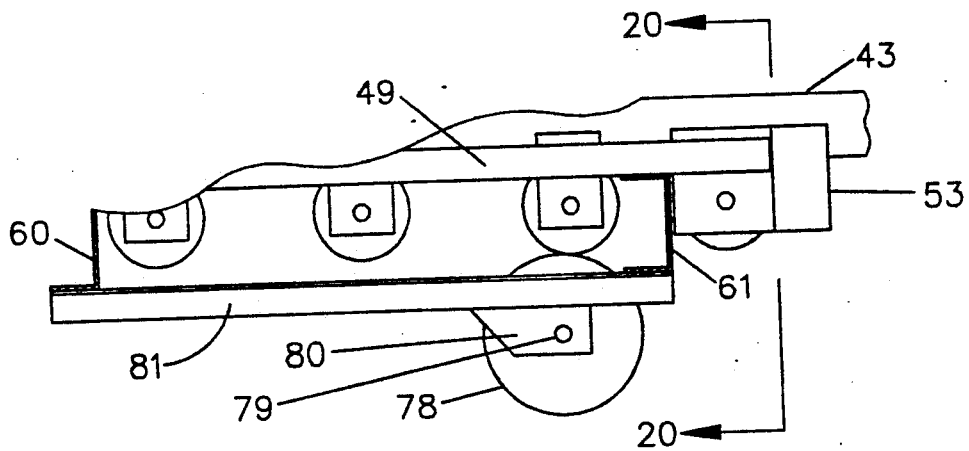
FIG. 19 depicts a partial side view of a trailer tilt limiting wheel.
Figure 20:
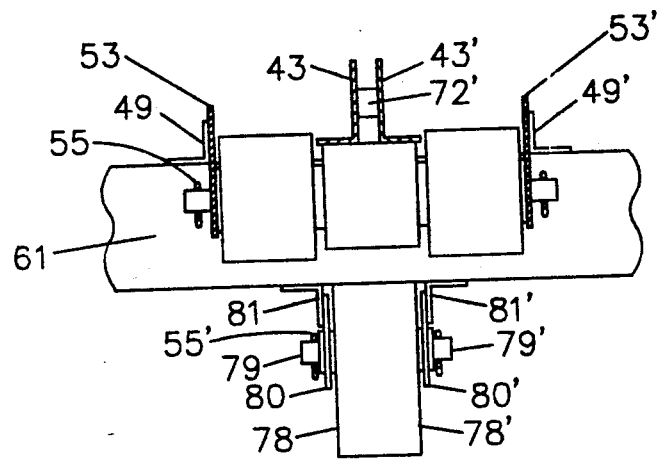
FIG. 20 depicts a rear view taken along the line 20—20 of FIG. 19.

Viewing FIGS. 19 and 20, a chassis tilt, or slant, limiting wheel 78 is show combined with the chassis, the wheel 78 being disposed underneath a rearward section of the chassis. Angle iron members 81, 81' are welded to bottom surfaces of chassis cross members 60, 61. The axle 79 supports 80, 80' are welded to the members 81, 81', the wheel 78 being rotatably mounted on the axle 79 and having the preferred cotter pins maintaining the axle 79 between the axle supports 80, 80'.

Figure 21:
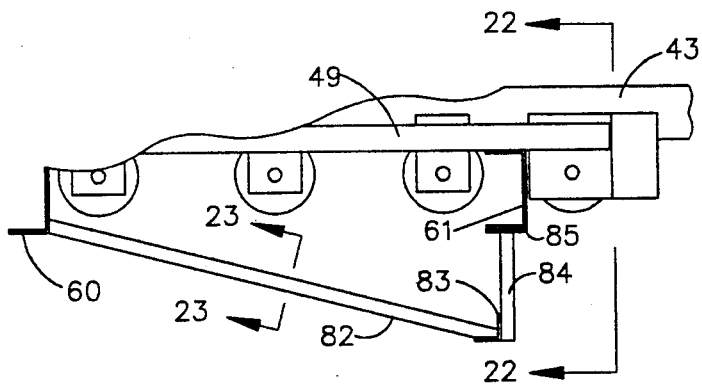
FIG. 21 depicts a view similar to FIG. 19 and shows a trailer tilt limiting stop, the stop being an alternate trailer tilt limiting device.
Figure 22:
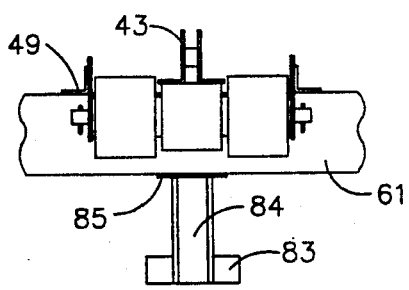
FIG. 22 depicts a rear view taken along the line 22—22 of FIG. 21.
Figure 23:
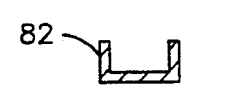
FIG. 23 is a view taken along the line 23—23 of FIG. 21 and shows sectional end view of common channel stock.

Viewing FIGS. 21 and 22, a chassis tilt limiting leg 84 is installed underneath a rearward section of the wheeled chassis. The leg 84 is welded to a plate 85 which is welded to chassis cross member 61. A foot 83 is welded to a bottom back side surface of the leg 84 and a brace 82 is welded between the foot 83 and a cross member 60 of the wheeled chassis. FIG. 23 simply shows that channel stock is the preferred bracing material. Channel stock is also the preferred material of the leg 84.

Figure 24:
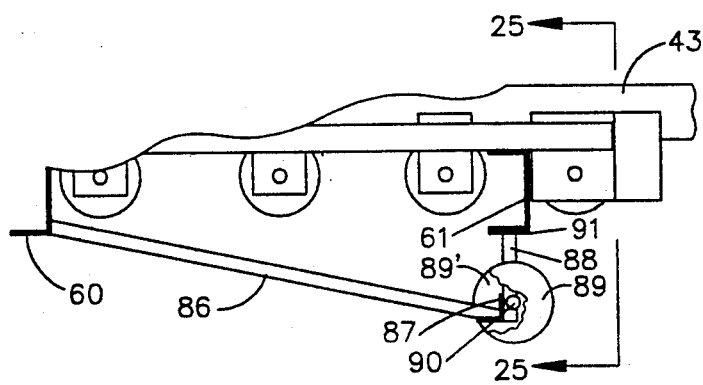
FIG. 24 depicts a view similar to FIG. 21, the view having a cut-away section and showing a pair of trailer tilt limiting wheels.
Figure 25:
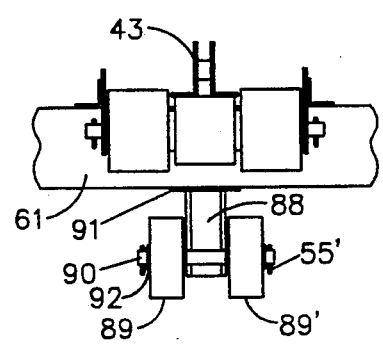
FIG. 25 depicts a rear end view of the trailer taken along the line 25—25 of FIG. 24.

Viewing FIGS. 24 and 25, an alternate method for installing chassis tilt limiting wheels underneath a rearward section of the wheeled chassis is shown. An end of a section of channel stock 88 is welded perpendicular to a plate 91 and the plate is welded to and below the rearmost cross member 61 of the wheeled chassis. An axle 90 is centered, fitted and welded cross tee fashion to the bottom of the section of channel stock 88. A diagonal brace 86 is welded between an angle iron stiffener 87 member of the channel stock 88 and a forward cross member 60 of the wheeled chassis. Wheels 89, 89' are rotatably mounted on the axle 90 having the washers 92 and cotter pins 55' maintaining the wheels on the axle.

Figure 34:
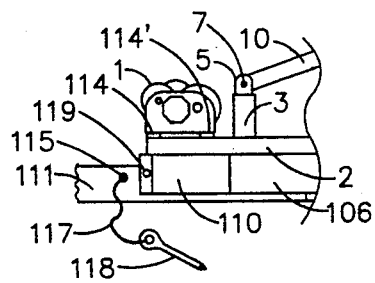
FIG. 34 depicts a partial side view of a forward area of the trailer, the view primarily presented to show a simple common break-back trailer locking pin linked to the tongue of the trailer.

Viewing FIG. 34, shown is a means for releaseably locking the tiltable wheeled chassis to the tow bar 111 such that the wheeled chassis is safe to transport. An aperture through the tow bar 111 is aligned with apertures through tiltable components of the wheeled chassis and a tow bar attached 115 flexibly link 117 is also attached to the safety pin 118. The pin 118 is removably receivable within the aligned apertures 119. The link 117 prevents the pin 118 from becoming inadvertently separated from the wheeled chassis. A person trained in the art could easily install any one of numerous conventional break-back trailer locking devices to prevent the possible tragedy that could occur should any break-back trailer tilt during transportation.

Figure 27:
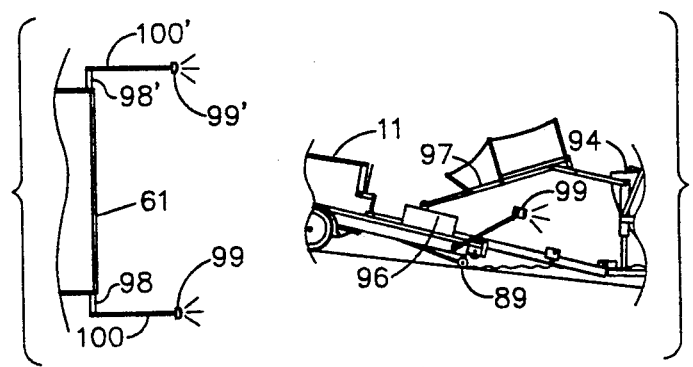
FIG. 27 depicts partial views of trailer tail light mounting means, a partial top view of the trailer with lights installed and a partial side view showing that the trailer lights are above the water during launching operations.

Viewing FIG. 27, shown is a partial top view of the rear distal laterally arranged cross member 61 of a trailer having cantilevered supports 98, 98', 100, 100', supporting trailer stop/signal lights 99, 99" and a partial side view of a launched cradle showing the trailer stop/signal lights well distanced from the water.

Figure 38:
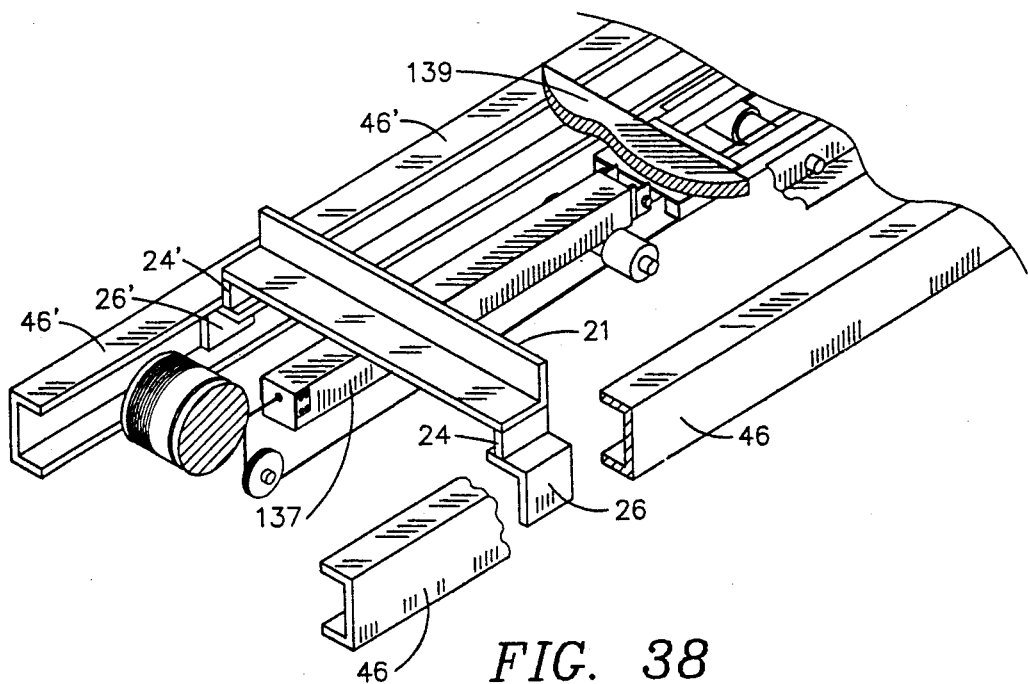
FIG. 38 depicts a partial perspective view of a telescoping push/pull rod, (pat. application Ser. No. 458,519, filed Dec. 28, 1989), the rod being improved by installing sliders thereupon.

Viewing FIG. 38, shown in the perspective view are sliders 26, 26' combined with the telescoping push/pull rod 137 disclosed in my U.S. Pat. No. 5,004,260. The protruding catch bar members of the telescoping push/pull rod 137 are no longer needed and therefore are not shown in the view. The telescoping push/pull rod 137 has a cross member 21 welded upon a near forward end surface area thereof, the cross member 21 having vertically arranged slider 26, 26' supports 24, 24' welded below the distal ends of the cross member. The sliders are shown slidingly captured within channels of the longitudinally arranged parallel members 46, 46' of the track. The track, to mean track members 46, 46', is combined with the trailer.

Figure 39:
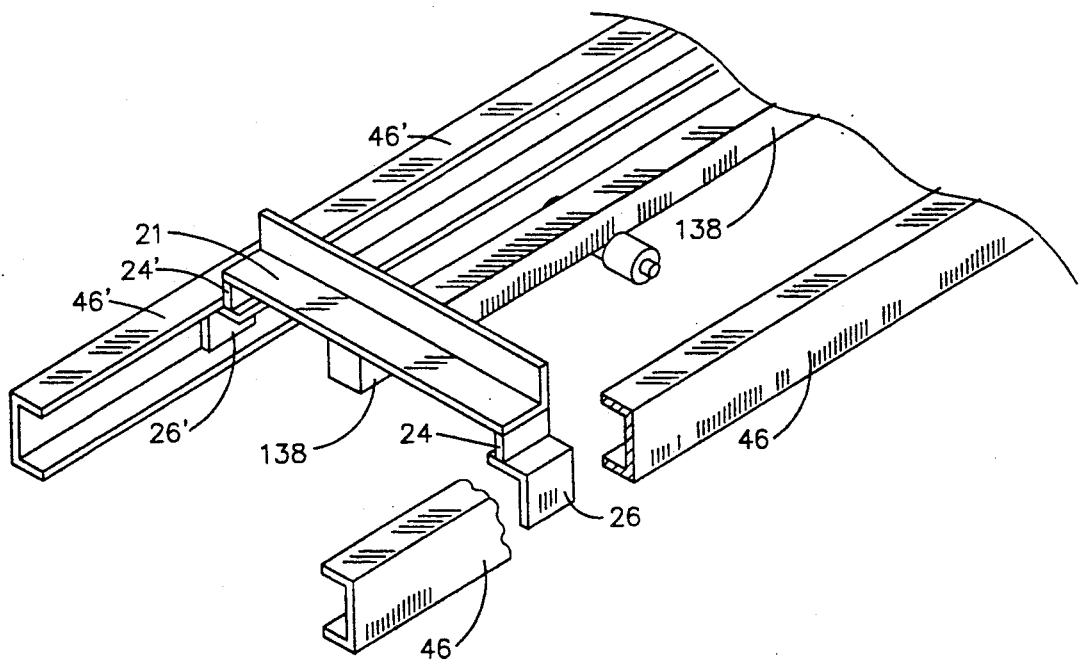
FIG. 39 depicts a view similar to FIG. 38 and shows a push/pull rod, (U.S. Pat. No. 4,911,459), also improved by installing sliders thereupon.

Viewing FIG. 39, shown in the perspective view are the sliders 26, 26' similarly combined with the push/pull rod 138 disclosed in my U.S. Pat. No. 4,911,459.

Figure 40:
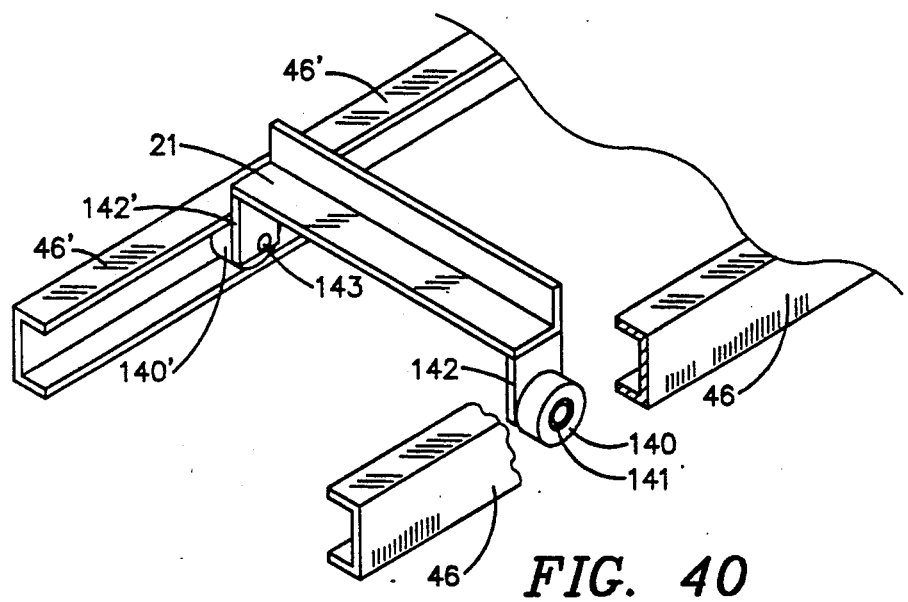
FIG. 40 depicts a partial cut-away perspective view of low friction conveyor means (small rollers) substituted for all slider components of the improvement invention.

Viewing FIG. 40, shown are open-face rollers 140, 140' being substituted for the slider members of the new cradle governor, and the old telescoping push/pull rod and push/pull rod. The open-face rollers provide low friction conveyor means for the new governor and the old push/pull rods when the forward ends thereof are captured by means for the track to receive and capture the rollers. The rollers 140, 140' are rotatably mounted on cantilevered bolt like pegs 143. Preferably the bolt like pegs 143 are grade 8 or better shoulder bolts having threads disposed within threaded apertures through the vertical roller support members 142, 142'. The heads of the bolts are counter-sunk within counter-sunk holes 141 centered on the open-face surfaces of the rollers.

Figure 26:
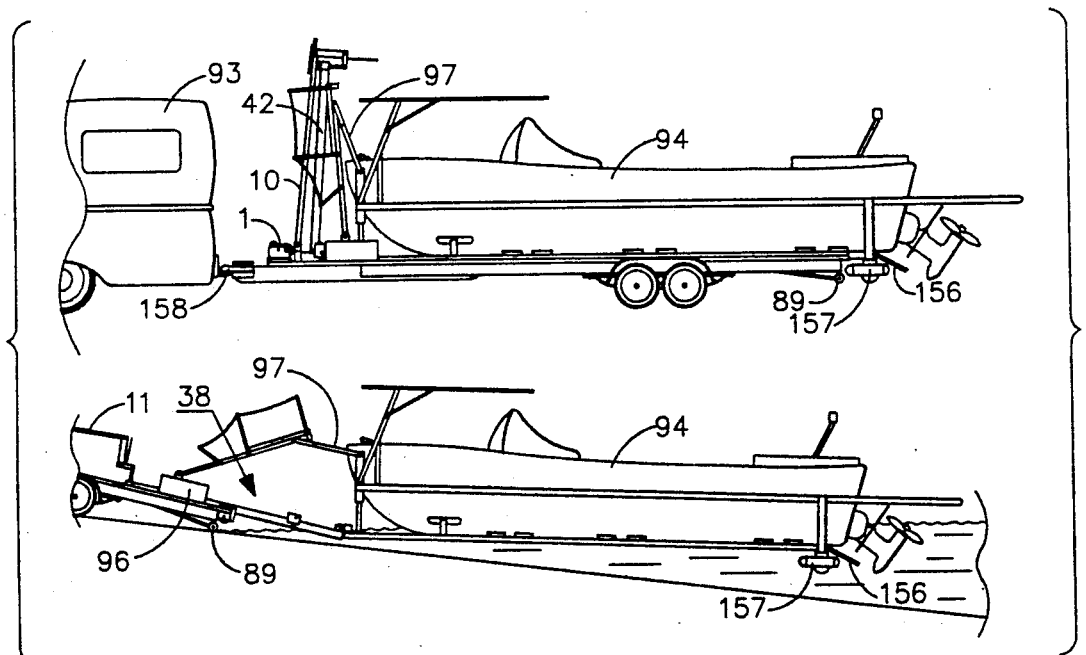
FIG. 26 depicts an elevation view of a retrieved and a launched cradle.
Figure 41:
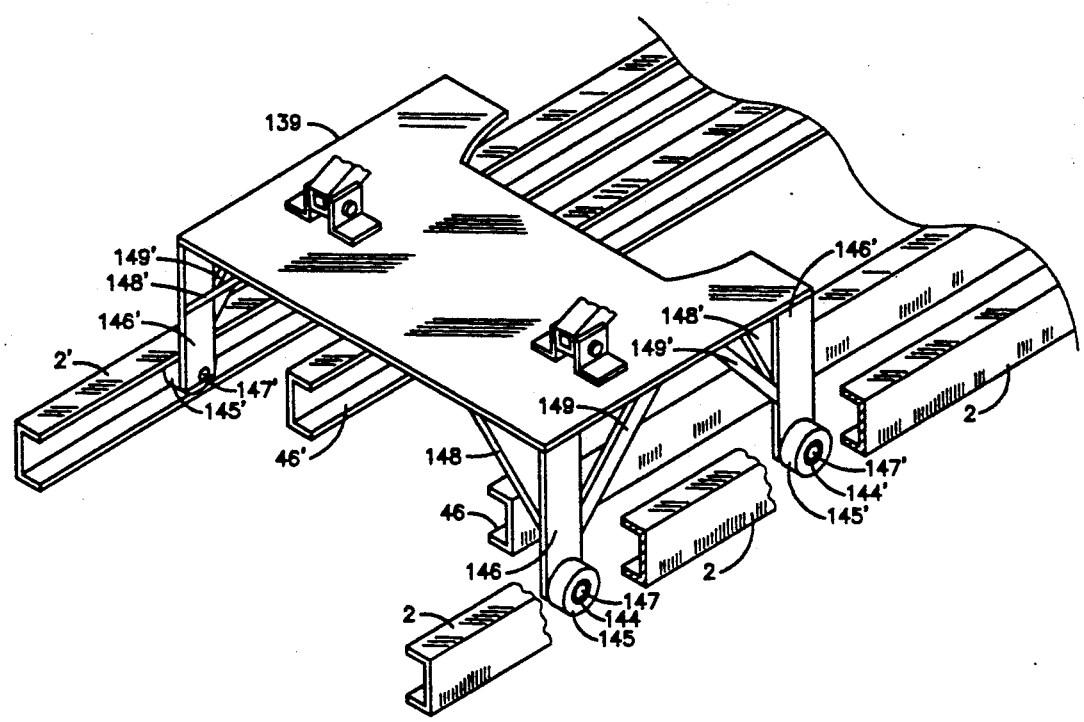
FIG. 41 depicts a partial cut-away perspective view of low friction conveyor means (small rollers) substituted for all glider members of the stabilizer platform member of the improved invention.

Viewing FIG. 41, the stabilizer platform 139 disclosed in my U.S. Patents previously referred to, is shown combined with and supported upon braced 148, 149 corner props 146, 146' the props replacing old stabilizer platform side support members 96, FIG. 26. Shown are open-face rollers 145, 145' being substituted for the old glider members of the stabilizer platform. The open-face rollers provide low friction conveyor means for the stabilizer platform, the rollers 145, 145' being captured within the channels of the preferred channel stock track members 2, 2' of the stabilizer track, the channels providing means for the stabilizer track to capture the rollers. The rollers 145 are rotatably mounted on cantilevered bolt like pegs 147, 147'. Preferably, the bolt like pegs 147 are grade 8 or better shoulder bolts having threads disposed within threaded apertures through the vertical stabilizer corner props. The heads of the bolts are counter-sunk within counter-sunk holes 144, 144' centered on the open-face surfaces of the rollers.

Figure 46:
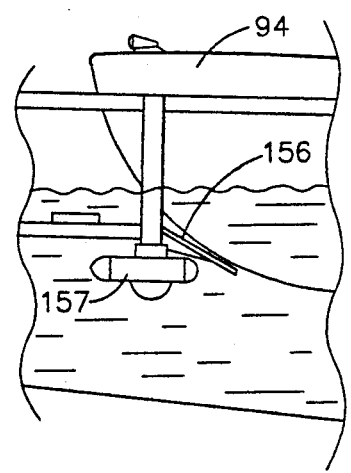
FIG. 46 depicts a partial side view of a vessel bow in contact with a vessel bow scoop member of the cradle.
Figure 47:
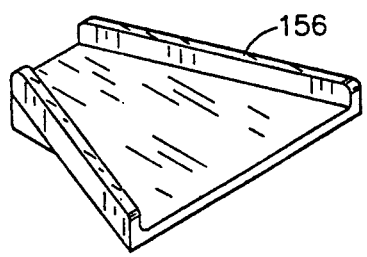
FIG. 47 depicts a perspective view of a vessel bow scoop separated from the cradle.

Viewing FIG. 46, shown is a marine vessel bellmouth like bow scoop 156 combined with the cradle, the scoop being attached upon a rear distal vessel entrance end of the cradle. The enlarged perspective view of FIG. 47 shows the scoop having converging vessel bow guide ridges extending above the downward slanted top surface thereof. The cradle, having positive buoyancy, must sink as a vessel is entering the cradle. The scoop 156 simply represents a device to aid vessels having a near blunt forward lower hull design as they enter and sink the cradle.

Figure 43:
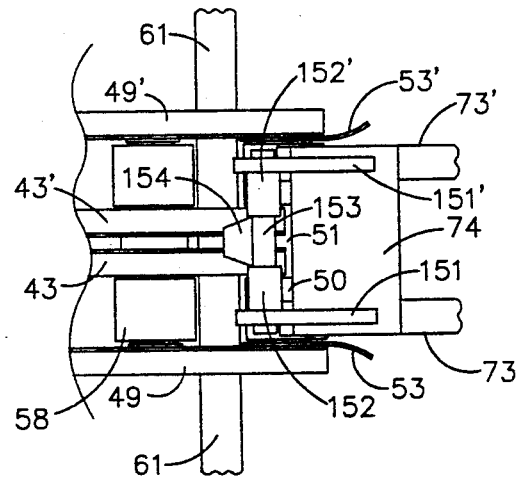
FIG. 43 depicts a partial top view of a very sturdy pivotal connection between the governor and the keel support platform members of the invention.
Figure 44:
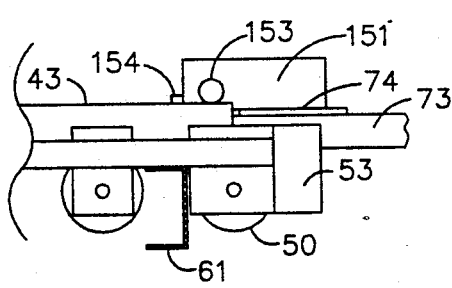
FIG. 44 depicts a partial side view of FIG. 43.
Figure 45:
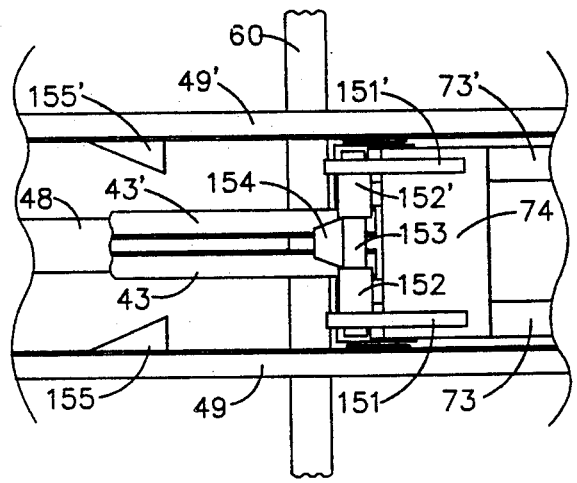
FIG. 45 depicts a partial cut-away view and shows keel support platform stops upon the improved invention.

Viewing FIGS. 43, 44 and 45, a rear distal end of the governor second section of rigid material is shown pivotally connected to a forward end of the keel support platform. These views must be shown to emphasize the fact that a powerful dominant pivotal connection of the governor to the keel support platform is necessary should, for reasons of economy, one desire to remove all folding stabilizer and stabilizer platform associated components from the improved invention. Because the governor and keel support platform are now pivotally connected as mentioned, the keel support platform is still maintained longitudinally aligned with the wheeled chassis when the cradle is launched. FIG. 43 shows a heavy duty cross member pin 153 solidly welded to the rear distal end of the governor sections 43, 43'. A brace 154 is welded across the sections 43, 43' and to the pin 153 for added strength at the weld seams. Spacers 152, 152' are installed on the pin 153 as shown and apertured heavy duty plates 151, 151' are placed on the opposite ends of the pin 153, the end portions of the pin 153 being snugly disposed through the plate 151, 151' apertures, and the plates are welded to the top surface of the keel support platform stiffener 74. FIGS. 43 and 44 show the keel support platform resting on the primal rollers 50 at the rear distal end of the wheeled chassis. FIG. 45 shows the keel support platform at a near forward position upon the trailer such that the keel support platform forward stops 155, 155' are shown.

Figure 48:
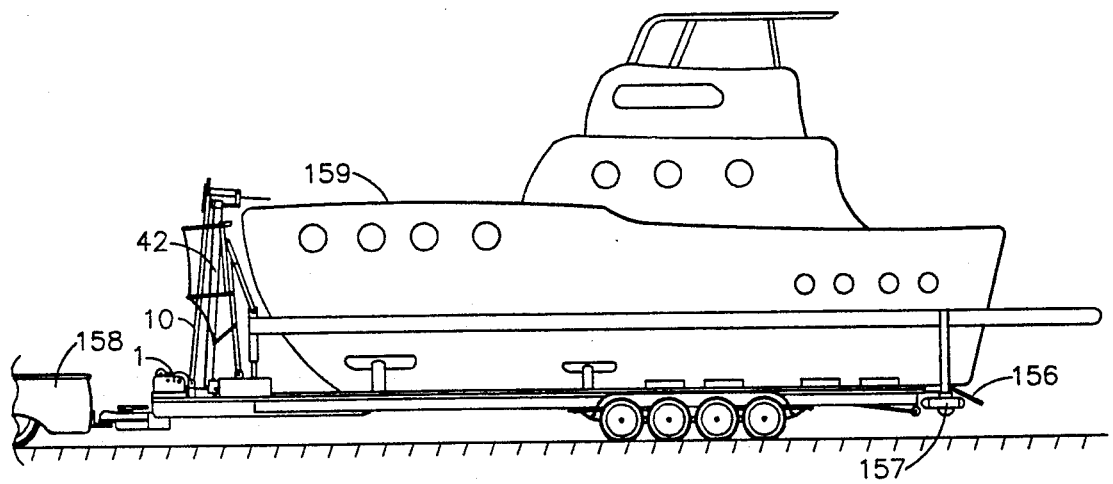
FIG. 48 is an exaggerated plain side view of a trailered cradled yacht.

Viewing FIG. 48, shown is an exaggerated view of a yacht such that the yacht, for the perspective first time ever, is ready to be launched, or transported, by the improved invention. It should be mentioned at this time that the trailer may have to enter the water during launching and retrieving of a deep draft marine vessel. None the less, a "beefed-up" version of the invention will launch, retrieve, and transport a marine vessel previously considered to massive to be generally trailered.

Viewing FIG. 26, a view of a launched and retrieved cradle, including a pleasure craft 94 and a towing vehicle 93, is shown.

As the end of this description rapidly approached several items need to be mentioned. As a result of my above and previous teachings, a person skilled in the art could easily provide a trailer having two or more longitudinally arranged parallel sets of rollers combined with a trailer such that two or more vessel supporting platforms supported upon the sets of rollers are launched and recovered from/onto the trailer. For instance, a governor or push/pull rod like device could be pivotally attached to a foremost lateral member of two or more vessel supporting platforms for the purpose of launching and recovering the platforms. Of course, two or more governor or push/pull rod like devices could be combined with the two or more platforms. The platforms could easily be adapted to support a pontoon, or even a tri-pontoon vessel.

Generally, ultra deep draft vessels (sail boats being ultra deep draft vessels because of the hull design) are not traditionally trailered to and from boat ramps. A person skilled in the art could easily design a sail boat hull supporting device having rigid supports extending down to laterally spaced apart platforms, the platform being easily launched and recovered from/onto a trailer.

A person skilled in the art could modify the bed of a transporting vehicle (truck) such that a modified version of my invention is combined with the bed of the vehicle.

The extending edges maintaining the keel support platform aligned upon the rollers can easily be replaced with numerous other type alignment/guide devices. For example, supported parallel rows of horizontally arranged platform guiding rollers could be combined with the invention to maintain the keel support platform aligned upon the primal and secondary rollers, the platform guiding rollers providing additional low friction conveyor means for the keel support platform.

A non break-back trailer designed to ride low to the ground could be combined with this invention. The tilt limiting devices disclosed could easily be replaced with fold-down supports combined with the non break-back trailer, the supports being necessary only when relatively heavy craft are to be launched and recovered from/onto the trailer.

A person skilled in the art could easily combine existing remote control devices with the invention such that a vessel could be launched and recovered by a person removed a distance from the winch means. Operating the trailered cradle and boat/yacht managing device from within the marine vessel would be convenient.

I have presented the foregoing description of the preferred embodiments of my improvement invention for the purposes of illustration and description. The description is not intended to be exhaustive or to limit the improvement invention to the precise forms disclosed. Many modifications and variations are possible in light of my above teaching. It is intended that the scope of my improvement invention be limited not by this detailed description, but rather by my claims appended hereto.

The embodiments of my improved invention in which an exclusive property or privilege is claimed are defined as follows:

1. An improved launcher/retriever boat cradle and trailered boat cradle of the type having a boat keel support platform; a buoyant wheeled cross tee member being secured to the aft end of said boat keel support platform; a winch means for launching and recovering said cradle; a folding stabilizer pivotally secured to two vertical members of a second cross tee, said second cross tee being secured to a forward vertically secured member of said boat keel support platform, said folding stabilizer being also pivotally secured to a stabilizer platform, said stabilizer platform including side support members, said side support means having a slippery entrapment upon two rails; wherein the improvement comprises:

(a) a wheeled chassis including a tow bar, said tow bar being pivotally attached to said chassis and having hitcher components thereof releasably connected to a towing vehicle;

(b) a pair of laterally spaced-apart primal rollers sandwiching a smaller diameter pilot roller, said primal rollers and pilot roller being rotatably mounted upon an initial axle;

(c) a pair of laterally spaced-apart primal guide brackets supporting said initial axle, said primal guide brackets being fixedly attached at a rear distal position upon siad chassis, said initial axle being laterally arranged with respect to said wheeled chassis, said primal guide brackets having inward facing surface areas extending above said primal rollers, said boat keel support platform resting upon said primal rollers and being aligned between said inward facing surface areas of said primal guide brackets;

(d) a plurality of pairs of laterally spaced-apart secondary rollers, each pair of said secondary rollers being rotatingly mounted upon a secondary axle;

(e) a pair of laterally spaced-apart alignment brackets supporting each of said secondary axles, said alignment brackets being fixedly attached upon said wheeled chassis, each of said secondary axles being laterally arranged with respect to said wheeled chassis, said alignment brackets having inward facing surface areas extending above said secondary rollers, said boat keel support platform resting upon said secondary rollers being aligned between said inward facing surface areas of said alignment brackets;

(f) an elongate skid platform, said skid platforms being longitudinally arranged and fixedly attached upon said chassis, said skid platform being medially arranged between said laterally spaced-apart secondary rollers;

(g) a track including longitudinally arranged parallel members fixedly attached upon said chassis;

(h) a break-back, fold up/out, cradle governor, said cradle governor including first elongate and second less elongate sections of rigid material, said governor first and second sections of rigid material being hinged together, said governor second section of rigid material having a rear distal end thereof pivotally connected to a forward end of said keel support platform, said governor being supported upon said pilot roller and captured between said primal rollers, said keel support platform moving rearward and relinquishing support upon said primal rollers, a pair of sliders fixedly attached at end points of a cross member of said governor first section of rigid material, a launcher cable, said launcher cable being attached to a launcher cable tie point at a forward end of said governor first section of rigid material, said launcher cable extending from said governor, training about launcher pulley members of said chassis and returning to said winch means, a retriever cable, said retriever cable being attached to a retriever cable tie point on said governor first section of rigid material, said retriever cable tie point being disposed below apertured hinge members of said governor first section of rigid material, said retriever cable extending to said winch means, said governor first and second sections of rigid material being formed to provide trench like spaces along the bottom surfaces thereof for receiving and housing lengths of said launcher and retriever cables; and (i) an elogated cradle governor lift, said lift including a rigid elongate tubular housing having a rigid elongate tubular insert slidingly inserted within a first open end thereof, said insert having a cantilevered boost member forming a distal end thereof and serving as a stop, said boost member of insert coming into contact with a surface area adjacent said first open end of said tubular housing, said boost member of insert member of lift being pivotally joined to a cantilevered lift bar, said lift bar forming an upper forward member of said governor first section of rigid material, said tubular housing having a second end thereof pivotally attached to brackets, said brackets being fixedly attached at a forward location upon said chassis, said lift maintaining said governor is a break-back and folded attitude, said keel support platform being retrieved to a forward position upon said wheeled chassis and resting upon said primal and secondary rollers, beginning rearward movement of said keel support platform causing said lift to begin unfolding said governor, continued rearward movement of said keel support platform allowing said governor to reach a prone folded out position upon said skid platform, continued rearward movement of said keel support platform resulting in said sliders being slidingly received/captured by said track, said prone governor and keel support platform continuing to move rearward, said governor insert member extending from within said housing member of said governor lift.

2. The improved launcher/retriever boat cradle and trailered boat cradle of claim 1 further comprising a vessel bow bell-mouth like scoop which is fixedly attached upon a rear distal vessel entrance end of said cradle.

3. The improved launcher/retriever boat cradle and trailered boat cradle of claim 1 further comprising means for adjusting the buoyancy of said cradle.

4. The improved launcher/retriever boat cradle and trailered boat cradle of claim 1 further comprising a walk-way platform which is combined with and fixedly attached upon said chassis and a fold-away hand rail which is combined with and fixedly attached upon said chassis.

5. The improved launcher/retriever boat cradle and trailered boat cradle of claim 1 further comprising a chassis tilt limiting wheel which is combined with said chassis and disposed underneath a rearward section of said chassis.

6. The improved launcher/retriever boat cradle and trailered boat cradle of claim 1 further comprising a chassis tilt limiting leg which is combined with said chassis and disposed underneath a rearward section of said chassis.

7. The improved launcher/retriever boat cradle and trailered boat cradle of claim 1 wherein said winch means comprises independent launcher and retriever winches.

8. An improved launcher/retriever boat cradle and trailered boat cradle of the type having a boat keel support platform; a buoyant wheeled cross tee member being secured to the aft end of said boat keel support platform; a winch means for launching and retrieving said cradle; a folding stabilizer pivotally secured to two vertical members of a second cross tee, said second cross tee being secured to a forward vertically secured member of said boat keel support platform, said folding stabilizer being also pivotally secured to a stabilizer platform, wherein the improvement comprises:

(a) a wheeled chassis including a tow bar, said tow bar including a hitcher, said hitcher providing means for releasably connecting said wheeled chassis to a towing vehicle;

(b) a pair of primal rollers sandwiching a smaller diameter pilot roller, said primal rollers and pilot roller being mounted upon an initial axle;

(c) a pair of primal guide brackets supporting said initial axis, said primal brackets being fixedly attached upon said chassis and having surface areas extending above said primal rollers for maintaining said keel support platform aligned upon said chassis;

(d) a plurality of pairs of secondary rollers mounted upon secondary axles;

(e) a pair of alignment brackets supporting each of said secondary axles, said alignment brackets being fixedly attached upon said chassis and having surface areas extending above said secondary rollers for maintaining said keel support platform aligned upon said chassis;

(f) a skid platform fixedly attached upon said chassis;

(g) a governor track fixedly attached upon said chassis;

(h) a folding cradle governor including first elongate and second less elongate sections, ends of said governor first and second sections being hinged together, said governor second section being pivotally connected to a forward end of said keel support platform, said governor being supported upon said pilot roller and captured between said primal rollers, said keel support platform relinquishing support upon said primal rollers, sliders, said sliders being fixedly attached at ends of a cross member of said governor first section, a launcher cable, said launcher cable being attached to a forward end of said governor first section, said launcher cable training about launcher cable pulleys and returning to said winch means, a retriever cable, said retriever cable being attached to said governor, said retriever cable extending from said governor to said winch means;

(i) props, said props supporting said stabilizer platform and having roller members thereof captured by a stabilizer track, said stabilizer track being fixedly attached upon said chassis, said roller members of said props providing low friction conveyor means for said stabilizer platform; and (j) an extensible lift including a tubular housing having an insert inserted within a first open end thereof, said insert having a cantilevered boost forming a distal end thereof, said boost being pivotally joined to a lift bar member of said governor first section, said tubular housing member of lift having a second end thereof pivotally attached to a bracket member of said chassis, said lift maintaining said governor in a folded attitude, said keel support platform being retrieved, beginning rearward movement of said keel support platform resulting in said governor beginning to unfold, continued rearward movement of said keel support platform allowing said governor to reach a prone position upon said skid platform, cntinued rearward movement of said keel support platform resulting in said sliders being received/captured by said governor track, said prone governor and keel support platform continued rearward movement resulting in said insert extending from within said tubular housing member of said lift.

9. The improved launcher/retriever boat cradle and trailered boat cradle of claim 8 futher comprising a vessel bow scoop which is fixedly attached upon a rear distal vessel entrance end of said cradle.

10. The improved launcher/retriever boat cradle and trailered boat cradle of claim 8 wherein said sliders are open-face rollers, said open-face rollers providing low friction conveyor means for said governor.

11. The improved launcher/retriever boat cradle and trailered boat cradle of claim 8 further comprising a walk-way and a fold-away hand rail which are combined with and fixedly attached upon said wheeled chassis.

12. The improved launcher/retriever boat cradle and trailered boat cradle of claim 8 wherein said tow bar is pivotally attached to said wheeled chassis, and pivotally attached tow bar providing a tiltable wheeled chassis.

13. The improved launcher/retriever boat cradle and trailered boat cradle of claim 12 further comprising a chassis tilt limiting wheel which is combined with said wheeled chassis and disposed underneath a rearward section of said wheeled chassis.

14. The improved launcher/retriever boat cradle and trailered boat cradle of claim 12 further comprising a chassis tilt limiting leg which is combined with said wheeled chassis and disposed underneath a rearward section of said wheeled chassis.

15. The improved launcher/retriever boat cradle and trailered boat cradle of claim 12 further comprising means for releasably locking said tiltable wheeled chassis to said tow bar such that a locked said wheeled chassis is safe to transport.

16. The improved launcher/retriever boat cradle and trailered boat cradle of claim 8 wherein said winch means comprises independent launcher and retriever winches.

17. An improved launcher/retriever boat cardle and trailered boat cradle of the type having a boat keel support platform; a buoyant wheeled cross tee member being secured to the aft end of said boat keel support platform; a winch means for launching and retrieving said cradle; a folding stabilizer pivotally secured to two vertical members of a second cross tee, said second cross tee being secured to a forward vertically secured member of said boat keel support platform, said folding stabilizer being also pivotally secured to a stabilizer platform, said stabilizer platform including side support members, said side support members having a slippery entrapment upon two rails; wherein the improvement comprises:

(a) a wheeled chassis adapted to be releasably connected to a towing vehicle;

(b) a pilot roller sandwiched between primal rollers, said pilot and primal rollers being rotatably mounted upon an initial axle, said initial axle being supported by primal guide brackets, said primal brackets being fixedly attached upon said chassis;

(c) a plurality of secondary axles, a pair of secondary rollers being rotatably mounted upon each of said secondary axles, each said secondary axle being supported by alignment brackets, said alignment brackets being fixedly attached upon said chassis;

(d) a track fixedly attached upon said chassis;

(e) an elongate governor including hinged first and second sections, said governor second section being pivotally connected to a forward end of said keel support platform, said governor resting upon said pilot roller, said governor being maintained between said primal rollers, sliders, said sliders being fixedly attached to a forward area of said governor first section, a launcher cable, said launcher cable being attached to a forward end of said governor first section; said launcher cable training about launcher pulleys and returning to said winch means, a retriever cable, said retriever cable being attached to said governor and extending to said winch means;

(f) an elongate extensible lift, means for pivotally connecting an end of said lift to a forward end of said governor first section, a remaining end of said lift being pivotally connected to a bracket member of said chassis, said lift maintaining said governor in a folded attitude, said keel support platform being retrieved and resting upon said primal and secondary rollers; beginning rearward movement of said keel support platform resulting in said governor beginning to unfold; continued rearward movement of said keel support platform allowing said governor to reach a prone position, said prone positioned governor resting upon a governor support combined with said chassis, continued rearward movement of said keel support platform resulting in said slider members of governor being received/captured by means for said track to receive and capture slider members of said governor.

18. The improved launcher/retriever boat cradle and trailered boat cradle of claim 17 wherein said boat keel support platform is aligned upon said primal and secondary roller when retrieved upon said chassis.

19. The improved launcher/retriever boat cradle and trailered boat cradle of claim 17 further comprising a tow bar, said tow bar being pivotally attached to said chassis, said pivotally attached tow bar providing a tiltable chassis, said chassis being releasably locked to said tow bar such that said chassis is safe to transport.

20. The improved launcher/retriever boat cradle and trailered boat cradle of claim 19 further comprising a chassis tilt limiting wheel which is combined with said wheeled chassis and disposed underneath a rearward section of said wheeled chassis.

21. The improved launcher/retriever boat cradle and trailered boat cradle of claim 19 further comprising a chassis tilt limiting leg which is combined with said wheeled chassis and disposed underneath a rearward section of said wheeled chassis.

22. The improved launcher/retriever boat cradle and trailered boat cradle of claim 17 further comprising a walk-way and a fold-away hand rail which are combined with and fixedly attached upon said wheeled chassis.

23. The improved launcher/retriever boat cradle and trailered boat cradle of claim 17 wherein said winch means comprises independent launcher and retriever winches.

24. The improved launcher/retriever boat cradle and trailered boat cradle of claim 17 further comprising a vessel bow bell-mouth like scoop which is fixedly attached upon a rear distal vessel entrance end of said cradle.

25. The improved launcher/retriever boat cradle and trailered boat cradle of claim 17 further comprising means for adjusting the buoyancy of said cradle.

26. An improved launcher/retriever boat cradle and trailered boat cradle of the type having a boat keel support platform; a buoyant wheeled cross tee member being secured to the aft end of said boat keel support platform; angle members including rollers, said angle members including edges extending above rollers such that said boat keel support platform upon said rollers is aligned within said extending edges: winch means for launching and recovering said cradle; a folding stabilizer pivotally secured to two vertical members of a second cross tee, said second cross tee being secured to a forward vertically secured member of said boat keel support platform, said folding stabilizer being also pivotally secured to a stabilizer platform, said stabilizer platform including side support members, said side support members having a slippery entrapment upon two rails; wherein the improvement comprises:

(a) an elongate folding governor combined with said boat keel support platform;

(b) an extensible lift, said lift being pivotally connected to a forward end of said governor and a forward end of a wheeled chassis, said lift maintaining said governor in a folded attitude, said keel support platform being retrieved upon said chassis, a retriever cable, said cable being attached to said governor and extending to said winch means; and (c) a track combined with said chassis, said governor having sliders which are captured by said track, said keel support platform having moved rearward upon said chassis, said lift having caused said governor to unfold and reach a prone position upon said chassis, and means for extending said lift during continued rearward movement of said keel support platform.

27. The improved launcher/retriever cradle for trailered boats and trailered boat cradle of claim 26 wherein said lift includes an elongate tubular housing having an elongate insert inserted therewithin, said insert having a cantilevered boost member pivotally joined to a cantilevered lift bar member of said governor, means for locking said insert within said housing, said governor being in a folded attitude and means for unlocking said insert, said governor being in a near prone position, an unlocked insert providing an extensible said lift.

28. The improved launcher/retriever boat cradle and trailered boat cradle of claim 26 further comprising a walk-way and a fold-away hand rail which are combined with and fixedly attached upon said wheeled chassis.

29. The improved launcher/retriever boat cradle and trailered boat cradle of claim 26 further comprising a tow bar, said tow bar being pivotally attached to said wheeled chassis, said pivotally attached tow bar providing a tiltable chassis, said chassis being releasably locked to said tow bar such that said chassis is safe to transport.

30. The improved launcher/retriever boat cradle and trailered boat cradle of claim 29 further comprising means for adjusting the buoyancy of said cradle, and a chassis tilt limiting wheel which is combined with said wheeled chassis and disposed underneath a rearward section of said wheeled chassis.

* * * * *